(12) United States Patent
Fujiwara et al.

(10) Patent No.: US 10,061,769 B2
(45) Date of Patent: Aug. 28, 2018

(54) MACHINE TRANSLATION METHOD FOR PERFORMING TRANSLATION BETWEEN LANGUAGES

(71) Applicant: PANASONIC INTELLECTUAL PROPERTY CORPORATION OF AMERICA, Torrance, CA (US)

(72) Inventors: Nanami Fujiwara, Nara (JP); Masaki Yamauchi, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 15/790,279

(22) Filed: Oct. 23, 2017

(65) Prior Publication Data

US 2018/0101522 A1    Apr. 12, 2018

Related U.S. Application Data

(63) Continuation of application No. 15/157,481, filed on May 18, 2016, now Pat. No. 9,836,457.

(30) Foreign Application Priority Data

May 25, 2015    (JP) .................. 2015-105525
Mar. 1, 2016    (JP) .................. 2016-039350

(51) Int. Cl.
*G06F 17/28* (2006.01)
*G06F 17/27* (2006.01)
(Continued)

(52) U.S. Cl.
CPC ...... *G06F 17/2854* (2013.01); *G06F 17/2775* (2013.01); *G06N 3/02* (2013.01); *G10L 15/26* (2013.01)

(58) Field of Classification Search
CPC .................................. G06F 17/28
(Continued)

(56) References Cited

U.S. PATENT DOCUMENTS 5,867,811 A    2/1999    O'Donoghue
6,085,162 A    7/2000    Cherny
(Continued)

FOREIGN PATENT DOCUMENTS

JP    2005-078318    3/2005
JP    2007-072877    3/2007
(Continued)

OTHER PUBLICATIONS

Papineni, K et al., "BLEU: A Method for Automatic Evaluation of Machine Translation", Proc. of the Annual Meeting of the ACL, pp. 311-318, 2002.

(Continued)

*Primary Examiner* — Jesse Pullias
(74) *Attorney, Agent, or Firm* — Greenblum & Bernstein, P.L.C.

(57) ABSTRACT

A machine translation method is provided, in which a plurality of different first forward-translated sentences is generated resulting from translation of a received translation-source sentence into the second language. It is determined into which of an interrogative form, an affirmative form, a negative form, and an imperative form each of the plurality of different first forward-translated sentences is classified. A plurality of different second forward-translated sentences is determined from the plurality of different first forward-translated sentences, based on the classified form. A plurality of backward-translated sentences is generated resulting from backward translation of the plurality of different second forward-translated sentences into the first language. Upon receiving an operation of the user for (Continued)

selecting one of the plurality of backward-translated sentences, a forward-translated sentence corresponding to the selected backward-translated sentence is output to the information output device.

19 Claims, 14 Drawing Sheets

(51) Int. Cl.
  *G06N 3/02* (2006.01)
  *G10L 15/26* (2006.01)
(58) Field of Classification Search
  USPC .......................................................... 704/2–8
  See application file for complete search history.

(56) References Cited

U.S. PATENT DOCUMENTS

| | | | |
|---|---|---|---|
| 6,182,026 B1 | 1/2001 | Tillmann | |
| 6,195,631 B1 | 2/2001 | Alshawi | |
| 6,236,958 B1 | 5/2001 | Lange | |
| 2014/0006007 A1 | 1/2014 | Sumita et al. | |
| 2014/0100843 A1 | 4/2014 | Tanaka | |

FOREIGN PATENT DOCUMENTS

| | | |
|---|---|---|
| JP | 2014-010623 | 1/2014 |
| WO | 2013/014877 | 1/2013 |

OTHER PUBLICATIONS

Natsume Kouchi et al., "Verification Using NTCIR-9 Data of Japanese Translation Automatic Evaluation Method Considering Scrambling" the 219th natural language processing workshop, Okayama Prefectural University, 2014.

Ilya Sutskever et al., "Sequence to Sequence Learning with Neural Networks", Advances in Neural Information Processing Systems 27, pp. 3104-3112, 2014.

Dzmitry Bahdanau et al., "Neural Machine Translation by Jointly Learning to Align and Translate", ICLR 2015.

MACHINE TRANSLATION METHOD FOR PERFORMING TRANSLATION BETWEEN LANGUAGES

This application is a continuation application of U.S. application Ser. No. 15/157,481, filed on May 18, 2016, which claims priority to Japanese Application Nos. 2016-039350, filed Mar. 1, 2016 and 2015-105525, filed May 25, 2015. The disclosures of these documents, including the specifications, drawings and claims, are incorporated herein by reference in their entirety.

BACKGROUND

1. Technical Field

The present disclosure relates to an apparatus for performing translation between languages, a method for performing translation between languages, and a system for performing translation between languages.

2. Description of the Related Art

With globalization in recent years, a machine translation apparatus and a machine translation system that allow users whose native languages are different from each other to communicate with each other have been developed. Services that provide machine translation functions have already been operated and are being put into practical use, for example, in scenes, such as travel conversations.

The machine translation apparatuses and machine translation systems described above require further improvements.

SUMMARY

In one general aspect, the techniques disclosed here feature a machine translation method that causes a first processor to: receive a translation-source sentence in a first language; generate a plurality of different forward-translated sentences resulting from translation of the received translation-source sentence into a second language; generate a plurality of backward-translated sentences resulting from backward translation of the plurality of different forward-translated sentences into the first language; and output, upon receiving an operation for selecting one of the plurality of backward-translated sentences during output of the plurality of backward-translated sentences on an information output device, the forward-translated sentence corresponding to the selected backward-translated sentence onto the information output device.

According to the above-described aspect, it is possible to realize further improvements.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
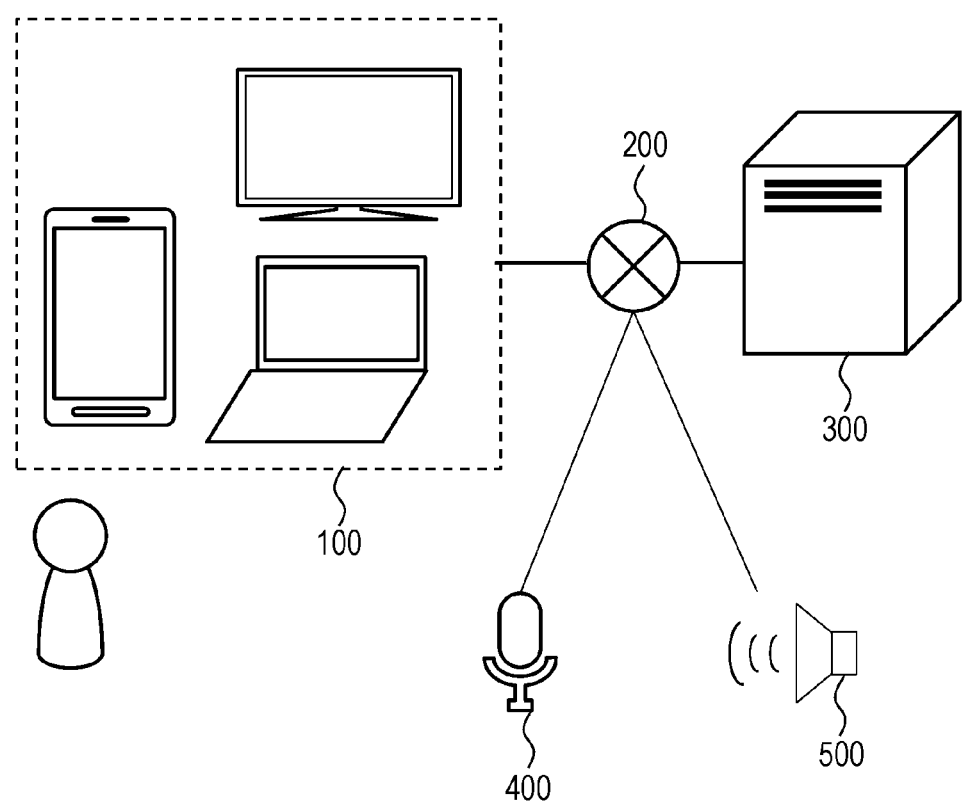
FIG. 1 is a diagram illustrating one example of an overall configuration of a machine translation system in the present embodiment.

The embodiments described below represent a specific example of the present disclosure. Numerical values, shapes, constituent elements, steps, the order of steps, and so on described in the embodiments below are examples, and are not intended to limit the present disclosure. Of the constituent elements in the embodiments described below, the constituent elements not set forth in the independent claims that represent the broadest concept will be described as optional constituent elements. In the embodiments, individual details thereof can be combined.

Knowledge that Led to Present Disclosure

Under the circumstance in which translation equipment is actively developed, it is desired that the machine translation accuracy be sufficiently high in order to realize smooth communication between different languages. In the current machine translation, however, it is extremely difficult to translate a given sentence without making an error, and the translation accuracy has been improved by limiting the field (domain) in which translation can be performed to travel conversations, but this approach is far from being perfect.

The machine translation technique can be broadly classified into three types. Herein, these three types of machine translation technique are called 1) rule-based machine translation (RBMT), 2) statistical machine translation (SMT), and 3) deep neural network based model-acquisition-type machine translation (DNNMT).

1) Rule-Based Machine Translation (RBMT)

Rule-based machine translation (RBMT) is a system for performing translation based on conversion rules (pairs of original and translated words stored in a database). In RBMT, a database of original sentences and translated sentences may be called a translation memory.

One advantage is that the rules (patterns for translation) can be strictly defined, and thus, when the original sentence (or part of the original sentence) exists in the rules, the translation accuracy of a corresponding segment increases. Thus, when translation expressions that fall within the rules are prepared, it is easy to maintain consistency of translation expressions that are output.

A shortcoming is that when no rules exist, the translation accuracy decreases significantly or the translation cannot be performed at all, and thus adaptability to business/industry fields other than intended fields is significantly low. Also, since the rules are basically manually constructed and expanded, the cost for development increases. In addition, it is necessary to add rules in order to improve the translation performance, and in order for a user to construct rules to customize the translation system, he or she needs to have a considerable amount of knowledge about an algorithm for designing the rules. Thus, it is not easy for general users to use this translation system. Thus, rule-based machine translation (RBMT) has mainly been applied to translations for business purposes (patent translation and so on), and many pieces of commercially available translation software for business purposes employ the rule-based machine translation and translation memories.

2) Statistical Machine Translation (SMT)

Statistical machine translation (SMT) is a scheme in which many pairs of sentences in a source language and corresponding sentences in a target language (a collection of the pairs is called a bilingual corpus) are prepared without creating rules like those in RBMT, and translation probabilities are statistically calculated based on the bilingual corpus to generate translated sentences. SMT is widely used by translation engines provided on the web by Google (registered trademark), Microsoft (registered trademark), and so on.

In this scheme, with respect to two models, that is, a language model (typically, the probabilities of appearances of words in a single language are represented as an n-gram model) and a translation model (typically, correspondences in units of words or phrases between two languages are represented as an alignment model, and the relationships of original-and-translated-word pairs at a vocabulary level are represented as a vocabulary model), translation probabilities are statistically calculated based on corresponding bilingual corpuses to obtain parameters (probability values) for the models, thereby realizing statistical translation. These models are generally called IBM models (when Japanese is included, a model called an "alignment models" may be added via syntax analysis).

Advantages of SMT are that, since it does not use rules like those in RBMT, it is possible to avoid the problem that the translation accuracy decreases significantly when there are no rules, and it is possible to construct a translation engine having a generalization capability.

Since SMT, on the other hand, is based on probabilistic expressions, it has a shortcoming in that it is necessary to prepare a large amount of bilingual corpus that provides a basis for probability calculations. While the generalization performance increases, the translation result is merely an output having a high probabilistic score. Thus, for cases in which translation was successfully performed using RBMT, there is no guarantee that a comparable translation accuracy can also be obtained by using SMT. That is, although the translation may be relatively good as a whole or on average, situations in which the reliability is low may arise in individual translation cases.

In addition, during probability calculation, it is necessary to multiply probability values output from internal models (the language model, the translation model, and so on). In this case, machine learning in which the probability values from the models are weighted and weights are used as parameters is performed in order to tune the entire translation engine for SMT. Machine evaluation values used in the machine learning are literally mechanical evaluation values (e.g., evaluation values called bilingual evaluation understudy (BLEU) values), and thus it has been reported that they do not necessarily match the user's subjective evaluation (see, for example, Natsume Kouchi, Hideki Isozaki, "Verification Using NTCIR-9 Data of Japanese Translation Automatic Evaluation Method Considering Scrambling", the 219th natural language processing workshop, Okayama Prefectural University, 2014 (hereinafter referred to as "Non-Patent Document 2")). That is, SMT has a structural drawback in that although the machine evaluation values are high, they do not lead to actual evaluation by users.

Even if the user or the system adds some sentences to the bilingual corpus in an attempt to improve the performance, output translations depend on probabilistic behavior after statistical processing is performed on the entire bilingual corpus. Thus, there is another structural drawback in that such addition does not directly lead to an improvement in the performance (such addition may cause a decline in the performance).

3) Deep Neural Network Based Model-Acquisition-Type Machine Translation (DNNMT)

Deep neural network based model-acquisition-type machine translation (DNNMT) is a relatively new translation technique obtained by applying a deep learning (DL) technique to machine translation (see, for example, Ilya Sutskever Papineni et al., "Sequence to Sequence Learning with Neural Networks", Advances in Neural Information Processing Systems 27, pp. 3104-3112, 2014 (this document is hereinafter referred to as "Non-Patent Document 3") and Dzmitry Bandanau et al., "Neural Machine Translation by Jointly Learning to Align and Translate", arXiv: 1409.0473v5, ICLR 2015 (this document is hereinafter referred to as "Non-Patent Document 4")).

Unlike translation schemes, such as RBMT and SMT, in which an input sentence or a bilingual corpus is applied to the manually designed rules or models and/or is subjected to statistical processing, DNNMT has a feature in that the system learns an appropriate model. At this point in time, DNNMT is a technique at its early stage and has not yet been put into practical use as machine translation, but in voice recognition, similar techniques have already been put into practical use, for example, in Siri (registered trademark) of Apple Inc.

An advantage is that, when learning an appropriate model succeeds, it is expected that the translation performance improves, and in particular, it is expected that translation results can be output without much deterioration in generalization performance that exceeds SMT and translation performance for a relatively long sentence (e.g., a sentence constituted by 40 or more words), which is not well translated by RBMT and SMT.

A shortcoming is that it is difficult to perform external control on how the DNNMT itself learns a model. Parameters that are comparable to "tuning using parameters" do not exist explicitly, and the number of internal variables is very large, but it is unclear which variable directly leads to the translation performance. That is, after the neural network architecture and input data and/or teacher data are determined, it is difficult to control how the system performs learning and what level of performance is achieved, and it is unclear how to improve the performance in principle. It is difficult to apply typical tuning schemes to DNNMT, and even when the user or the system attempts to improve the performance, it is more difficult to take measures than in SMT. DNNMT has some structural drawbacks. That is, even if a few sentences are added to the bilingual corpus, translation outputs depend on neural network learning, and what is output is unknown unless internal variables in the neural network are determined.

The above description has been given of features, advantages, and shortcomings of the machine translation technique broadly divided into the three types.

On the other hand, when the machine translation technique is seen from the point of view of the user, there is a possibility that he or she can make a conversation on the basis of a translation output result even when the accuracy of the machine translation is not so high, as long as he or she is knowledgeable about the target language, which is a language into which he or she wants to translate. That is, it can be expected that the user can decide whether an output resulting from the machine translation is correct or incorrect and can use useful translation segments.

In practice, however, cases in which the user cannot understand what is meant by the translation result output from the machine translation even when he or she refers to the translation result are easily presumed. For example, when the user is assumed to be a Japanese, there is a case in which he or she wants to translate Japanese language into a major language (such as English) or a case in which he or she wants to translate Japanese language into a relatively minor language (e.g., Malay language or Vietnamese language). For example, when the target language is English, a user who is knowledgeable about English may be able to use the results of the machine translation to help his or her conversations in English by referring to the results. On the other hand, when the target language is a minor language, the user has no knowledge about the target language in many cases and thus cannot obtain any information about whether or not the content of the machine translation result is correct. That is, even when a translated sentence in the target language is presented to the user through machine translation, there are cases in which he or she cannot understand the content of the sentence at all. A few thousands of languages are thought to exist, and it can even be said that most users have no knowledge about the majority of the languages. Thus, when a user cannot understand what is meant by a translation result in a target language, he or she may present a translated sentence without being able to check its meaning conveyed to the partner, and thus the communication may fail.

In order to improve the machine translation accuracy even a little under such a current situation, it is desired that the machine translation system itself perform automatic learning to improve the performance. The machine translation system needs to be constructed so that no burden is placed on the user (a source language speaker) when the machine translation system performs automatic learning and so that a translated sentence can be generated and utilized while the user checks, using a simple method, its meaning conveyed to the partner. The machine translation system is required to perform automatic learning by using the user's utilization results. Naturally, at the same time, it is required that computer resources needed for the system and the development cost be reduced as much as possible.

That is, what are needed for the machine translation system are threes requirements: requirement 1 of "being able to generate and utilize a translated sentence without placing a burden on the user while the user checks, in an easy way, its meaning conveyed to the partner", requirement 2 of "being able to automatically perform learning by using the user's utilization results (without placing a further burden on the user)", and requirement 3 of "reducing the computer resources and the development cost at the same time requirements 1 and 2 are satisfied". Realization of a machine translation system that satisfies these three requirements at the same time has been an issue.

Examples of techniques that address the issue include: a technique in which usage examples obtained by associating source-language usage examples and target-language usage examples are pre-held as a database or rules, a usage example similar to a sentence input via speech is obtained, and sentences are presented in both a source language and a target language (see, for example, Japanese Patent 5653392 (hereinafter referred to as "Patent Document 1")), like in RBMT; and a technique in which a distance between an input sentence and a result of backward translation (i.e., translation from a target language calculation into a source language) is calculated as a reliability, the reliability and the backward translation result are presented together, as needed, and the user is made to rephrase or restate the backward translation result (see, for example, International Publication No. 2013/014877 (hereinafter referred to as "Patent Document 4")). Further examples include a technique that uses BiLingual Evaluation Understudy (BLEU), which is a scheme for evaluating the performance of a statistical machine translation (SMT) system (see, for example, Papineni, K., Roukos, S., Ward, T., and Zhu, W. J. "BLEU: A Method for Automatic Evaluation of Machine Translation", Proc. of the Annual Meeting of the Association of Computational Linguistics (ACL), pp. 311-318, 2002 (this document is hereinafter referred to as "Non-Patent Document 1"")); a technique in which N backward-translated sentences are obtained with respect to an input sentence, and evaluation is performed through comparison of the input sentence with the backward-translated sentences (see, for example, Japanese Unexamined Patent Application Publication No. 2005-78318 (hereinafter referred to as "Patent Document 2")); and a technique in which during registration of source and target language words or phrases in a bilingual dictionary, a result obtained by determining whether or not registering the words or phrases is effective for a translation apparatus of interest is machine-learnt (see, for example, Japanese Patent 5097340 (hereinafter referred to as "Patent Document 3")).

Patent Document 1 discloses a technique in which source-language usage examples and target-language usage examples that are translated sentences of the source-language usage examples are stored in a usage-example storage unit in association with each other.

In Patent Document 1, based on the information stored in the usage-example storage unit, an input source-language character string and a target-language character string corresponding to the source-language character string are displayed in different display areas on a display unit.

More specifically, an input source-language character string and character strings of usage examples that are similar to the input source-language character string are displayed in the same display area, whereas target-language character strings corresponding to the input source-language character string and the character strings of the similar usage examples are displayed in a different display area. The source language speaker and the target language speaker can check the usage examples when they want to check the meaning relative to the input sentence. In addition, a similar sentence usage example selected by the target language speaker or the source language speaker is also displayed to the opposing speaker in a highlighted manner or the like.

In Patent Document 1, a source-language character string, which is an input sentence, is obtained, similar usage examples in source and target language sentence examples in a database are searched, and when the similarity between the source-language character string and each found usage example is higher than or equal to a threshold, it is determined that the found usage example is a similar usage example, and the found usage example is output as a similar usage example for the input sentence. In this case, in Patent Document 1, when the user performs an operation for selecting one of the output similar usage examples, the selected usage example is displayed in a highlighted manner.

Patent Document 2 discloses a technique in which upon receiving a forward-translated sentence that the forward-direction machine translator 11 outputs with respect to an original sentence, the backward translators 12a, 12b, and 12c translate the forward-translated sentence into backward-translated sentences A, B, and C, and the evaluator 13 evaluates the forward-translated sentence on the basis of the backward-translated sentences A, B, and C and the original sentence for the forward-translated sentence.

The technique disclosed in Non-Patent Document 1 has been generally known as a scheme for evaluating the forward-translated sentence. In Non-Patent Document 1, the number of matches in N-grams between a reference translation (a manually created correct translation) and a translation output as a result of machine translation is calculated, and correction considering the influence of the length of the reference translation is performed to obtain a BLEU value. BLEU is often used as a scheme for evaluating the translation accuracy. In particular, for translation between different languages in which the word orders differ greatly, such as Japanese to English translation or English to Japanese translation, it has been known that correlations with manual evaluation is low (see, for example, Non-Patent Document 2).

Patent Document 2 further discloses a technique in which after dynamic programming (DP) matching between each of the backward-translated sentences A, B, and C and the original sentence is performed, the backward-translated sentence having the highest score and the original sentence are output. An evaluator can perform subjective evaluation on the forward-translated sentence by comparing the output backward-translated sentence with the original sentence.

As described above, when translation is performed under a circumstance in which the machine translation accuracy is not sufficiently high, the system needs to generate a translation speech sentence in an easy way while checking its meaning to be conveyed to the partner and to perform evaluation/learning by using a selection of the user (the source language speaker) as an evaluation, without placing a burden, such as repeatedly performing an input, on the user.

As described above, the machine translation system needs to satisfy three requirements, that is, requirement 1 of "being able to generate and utilize a translated sentence without placing a burden on the user while the user checks, in an easy way, its meaning conveyed to the partner", requirement 2 of "being able to automatically perform learning by using the user's utilization results (without placing a further burden on the user)", and requirement 3 of "reducing the computer resources and the development cost at the same time requirements 1 and 2 are satisfied".

In order to address this issue, the above-described three types of technique employ approaches as described below.
1) Rule-Based Machine Translation (RBMT)

As described above, in Patent Document 1, similar source-language sentences are output based on the input source-language character string, and also translated sentences corresponding to the output similar source-language sentences are output in a selectable manner. For example, when the source-language character string is input using voice, influences of input errors, such as a voice recognition error or the like, during input of the voice can be reduced, and the user can easily select the content he or she wants to convey.

Paragraph [0012] in Patent Document 1 has a description "Usage examples in a source language (hereinafter also referred to as "source-language usage examples") and usage examples in a target language (hereinafter also referred to as "target-language usage examples") are stored in the usage-example storage unit 105 in association with each other.", and the usage-example storage unit 105 serves as a database for usage-example searching and stores therein pairs in the source language and the target language. This portion corresponds to the database of the rule-based translation.

Paragraph [0011] in Patent Document 1 has a description "The machine translator 103 receives a source-language character string from the voice recognition unit 102 and performs machine translation to translate the source-language character string into a character string in a target language (also referred to as a second language) to obtain a target-language character string, which is a character string resulting from the translation. Since specific processing of the machine translation may be realized by typical processing, a description thereof is not given herein." Patent Document 1, however, discloses neither advantages nor problems with using SMT or DNNMT for the machine translator 103, and merely discloses, in a characteristic manner, the operation of the usage-example storage unit 105 as RBMT for the entire voice translation system in Patent Document 1.

As described above, RBMT has the problem that the translation accuracy decreases significantly or the translation cannot be performed at all when an input sentence for which no rule is stated is received or when an input regarding an unsupported business/industry field is received. In Patent Document 1, when a similar usage example for a voice input is not stated in the usage-example storage unit 105 or when the field thereof is different from a field of interest, there is a possibility that a translated sentence whose translation accuracy is significantly low is presented, which can lead to a situation in which a user who has no knowledge about the target language presents the translated sentence without being able to check its meaning conveyed to the partner (or presents the translated sentence with misunderstanding of the meaning conveyed to the partner). Patent Document 1, however, discloses neither such an issue nor a solution thereto.

In addition, when no similar usage example exists in the usage-example storage unit 105, no similar usage example is presented, so that the user has no choice but to use the input sentence (with many errors) resulting from the voice recognition. The translation result is also merely a translation result of the machine translator 103 with respect to the input sentence resulting from the voice recognition. In this case, the user cannot "easily select a sentence that matches the meaning he or she wants to convey", and Patent Document 1 does not disclose a solution to this issue either.

That is, with respect to requirement 1, it can also be said that Patent Document 1 partially discloses a means with which "the user can easily perform selection (of a sentence)", by presenting a plurality of similar-sentence search results to thereby provide means for selecting a sentence. However, when no similar usage example exists in the usage-example storage unit 105 corresponding to RBMT, choice itself is lost, and thus a means with which "the user can easily perform selection (of a sentence)" is not fully provided.

In addition, with respect to "checking the meaning conveyed to the partner", a solution is merely provided to a limited extent only when an intended sentence is found from the usage examples held in the usage-example storage unit 105, and there is no description about an output resulting from translation performed by the machine translator 103. That is, there is no description about whether or not the translation result of the machine translator 103 matches the content of the original source-language character string (Paragraph [0011] in Patent Document 1 has the description "The machine translator 103 receives a source-language character string from the voice recognition unit 102 and performs machine translation to translate the source-language character string into a character string in a target language (also referred to as a second language) to obtain a target-language character string, which is a character string resulting from the translation. Since specific processing of the machine translation may be realized by typical processing, a description thereof is not given herein." Thus, the correctness of the output of the machine translator 103 is not ensured), and even if a result that is very different from the content of the source-language character string is output from the machine translator 103, there is no way for the user to know it. That is, Patent Document 1 neither discloses nor overcomes the above-described issue "a user who has no knowledge about a target language presents a translated sentence without being able to check its meaning to be conveyed to the partner".

Also, Patent Document 1 has neither a disclosure nor a suggestion about requirements 2 and 3. In particular, with respect to requirement 3, rather than reducing the total weight of the system, the usage-example storage unit 105, which corresponds to RBMT, is further required in addition to the machine translator 103, thus resulting in increases in both the computer resources and the development work hours.

In order to realize, requirement 2 of "being able to automatically perform learning by using the user's utilization results, without placing a further burden on the user" in RBMT, an approach in which morphological analysis is performed on each of an input sentence and a translated sentence, and during registration of source and target language words or phrases in a bilingual dictionary, machine learning is performed on a result of a determination as to whether or not registering the source and target language words or phrases is effective for a corresponding translation apparatus has been disclosed, for example, as in Patent Document 3.

Paragraph [0020] in Patent Document 3 has a description "5 indicates a machine translation engine, and for example, in rule-led machine translation - - - ", which exemplifies RBMT named "rule-led machine translation" in a translation system, and discloses a method for determining the effectiveness during registration of source and target language words or phrases in the bilingual dictionary. In Patent Document 3, when a new word or phrase is registered in a rule-based bilingual dictionary, a determination as to whether or not registering the word or phrase is effective for the system is made by performing morphological analysis on pairs of source and target language words or phrases stored up to this point and then verifying the result of the analysis against a determination space identified using a support vector machine. That is, the "registration of new words or phrases in the rule-based bilingual dictionary" is performed independently of translation utilization by the user, and the issue about the automatic learning using the user's utilization results is neither disclosed nor overcome.

In general, RBMT has a shortcoming "when no rules exist, the translation accuracy decreases significantly or translation cannot be performed at all, and thus adaptability to business/industry fields other than intended fields is significantly low", and this shortcoming has not essentially been overcome (see, for example, Patent Document 1).

It is also necessary to add rules in order to improve the translation performance, which requires development cost. In addition, in order for a user to construct rules to customize the translation system, he or she needs to have a considerable amount of knowledge about an algorithm for designing the rules. Thus, it is not easy for general users to use this translation system. That is, the possibility that adverse effects and interferences among rules occur increases dramatically as the number of rules in RBMT increases, and a situation in which when an effective rule is added for one sentence example, inconvenience occurs in another sentence example occurs frequently. In order to avoid such a situation, it is necessary to understand all rules in the system and to add new rules, which makes it difficult to not only perform "automatic learning using the user's utilization results" but also add simple rules. For example, in Patent Document 3 described above, an attempt is made to automatically determine the effectiveness of only word translation pairs among the translation rules in RBMT, and preventing interference with syntactical translation rules has not been achieved.

Since RBMT has such a principle shortcoming, achieving "efficient and easy registration of words and usage examples in the RBMT database by the user" has been disclosed as an issue in RBMT. The above-described Patent Documents disclose techniques in which the user is explicitly requested to input data for learning and to make a decision, but neither disclose nor overcome the issue about not making such a request to the user, that is, about "automatic learning using the user's utilization results".

2) Statistical Machine Translation (SMT)

In SMT, there are some schemes. One example is a scheme in which the distance between an input sentence and a result of backward translation (which is a sentence obtained by temporarily translating the input sentence into a target language and then re-translating the resulting sentence in the target language into the source language) is calculated as a translation reliability, the translation reliability and the result of the backward translation are presented together, as needed, and the user is made to rephrase or restate the sentence (see, for example, Patent Document 4). Patent Document 4, however, also describes a case that is not predicated on SMT and also assumes RBMT as a machine translation engine. In paragraph [0009] in Patent Document 4, RBMT is defined as "grammatical-rule-type translation". Schemes for evaluating the translation accuracy in SMT include, for example, a scheme in which automatic learning is performed using a similarity (BLEU value) for each word n-gram (see Non-Patent Document 1) and a scheme in which N backward-translated sentences for a translated sentence obtained with respect to an input sentence are generated, and whether the translated sentence is good or poor is evaluated through comparison on the basis of the similarities between the input sentence and the backward-translated sentences (see, for example, Patent Document 2).

With respect to requirement 1 of "being able to generate and utilize a translated sentence without placing a burden on the user while the user checks, in an easy way, its meaning conveyed to the partner", for instance, Patent Document 4 in which the backward translation result is presented to the user, among the above-described examples, discloses a scheme for checking the "meaning conveyed to the partner" with the user. However, with respect to "being able to generate and utilize a translated sentence in an easy way", the user is requested to perform an input again or to restate the sentence in accordance with the backward translation result, and thus the above-described issue has not yet overcome.

More specifically, paragraph [0013] in Patent Document 4 has a description "There are provided a reliability calculation apparatus, a translation-reliability calculation utilization method, and a translation engine program that can appropriately obtain the reliability of a translation result and that can appropriately prompt the user at the input side to perform an input again when the reliability is low". That is, when the system determines that the reliability of the translation result is low, the user is not only forced to input the original sentence again but also required to continuously execute work for checking an input to the translation system and a translated-sentence output therefrom while performing trial-and-error processes, such as modifying the expression of the original sentence, until a translated sentence with a sufficiently high reliability is output. In addition, what has to be noted in this case is that the user has no knowledge about "with what internal operation the translation system generates a translated sentence", "with what criterion the translation system calculates a reliability", and "how the translation system can obtain a translated sentence having a high reliability". Without any guidelines, the user is forced to input a sentence while restating it in various ways in order to obtain a translation result with a high reliability. Thus, from the point of view of practicality, this system is very difficult for the user to use. Patent Document 4 neither describes an issue nor presents a solution to those described above, and thus it can be said to be insufficient in terms of "being able to generate and utilize a translated sentence in an easy way".

With respect to requirement 2 of "being able to automatically perform learning by using the user's utilization results (without placing a further burden on the user)", "being able to generate and utilize a translated sentence while the user checks, in an easy way, its meaning conveyed to the partner" without placing a burden on the user has not been realized in either RBMT or SMT, as described above in connection with requirement 1 of "being able to generate and utilize a translated sentence while the user checks, in an easy way, its meaning conveyed to the partner" without placing a burden on the user. Thus, since a scheme for obtaining the "user's utilization result" that satisfies requirement 1 has not been disclosed, no issue has been disclosed and no solution has been presented about automatic learning using the "user's utilization result" that satisfies requirement 1.

As described above in terms of the methods for automatic evaluation and learning in a translation system when the lack of a scheme that obtains the user's utilization result that satisfies requirement 1 is predicated and some other data for learning is given, there are techniques including a technique in which BLEU-value-based automatic learning, which is a scheme for evaluating the performance of a statistical machine translation system, is performed (see, for example, Non-Patent Document 1); a technique in which N backward-translated sentences are obtained with respect to an input sentence, and comparison and evaluation are performed based on the similarities between the input sentence and the backward-translated sentences (see, for example, Patent Document 2); and a technique in which during registration of source and target language words or phrases in a bilingual dictionary, a result obtained by determining whether or not registering the words or phrases is effective for a translation apparatus of interest is machine-learnt (see, for example, Patent Document 3).

In Non-Patent Document 1, a reference translation (correct translation data) for an input sentence is prepared, a translation output result of a translation engine is compared with the correct translation data on the basis of n-grams in a single language to thereby mechanically calculate the result of the comparison as a value (BLEU score), and the system is tuned so that the value is large. Since the input sentence and the reference translation (translated sentence), which serves as the correct translation data, need to be prepared in advance, the internal model of the translation engine is essentially not changed by the tuning, and merely a weight changes. Thus, when it is desired to learn the model itself or when the correct translation data is not given or is not uniquely determined, this scheme is not applicable.

Even if the "user's utilization result that satisfies requirement 1" is obtained, this result is a result obtained by "generating and utilizing a translated sentence while the user checks, in an easy way, its meaning conveyed to the partner". Neither an issue nor a solution is disclosed about "which result is correct translation data", "how the result is uniquely regarded as the correct translation data", and "how subsequent model learning is performed".

Patent Document 2 discloses a technique in which a translation result is translated back into the source language by a plurality of backward translation units, and the similarities between an input sentence and the backward-translated sentences are mechanically calculated to thereby evaluate whether the original translation result is good or poor. Although Patent Document 2 discloses generating a plurality of backward-translated sentences to evaluate the original translation result, the issue that is addressed in Patent Document 2 is performing some automatic evaluation on the translation result, and in this respect, there is essentially no difference from Non-Patent Document 1 described above. That is, Patent Document 2 discloses only calculating a score (a score typified by the "BLEU value" in Non-Patent Document 1) indicating a match or similarity between a correct sentence (which corresponds to the "reference translation" in Non-Patent Document 1 and which corresponds to the "input sentence" in Patent Document 2) and a translation result sentence (which corresponds to the "translated sentence" in Non-Patent Document 1 and which corresponds to, in Patent Document 2, the "backward-translated sentence" obtained by performing backward translation on the translation result) and evaluating whether or not the translation result is good or poor on the basis of the value of the calculation.

Although Patent Document 2 does not describe learning of the translation system itself, paragraph [0048] in Patent Document 2 has a description " . . . DP matching is performed between three backward-translated sentences and the original sentence, and a highest score can be used as the result of automatic evaluation of the forward-translated sentence to thereby make it possible to evaluate not only translated sentences that are example sentences but also all translated sentences, to reduce the amount of labor for the evaluation, and to increase the reliability of the evaluation". In addition, paragraph [0009] states that an object of Patent Document 2 is to construct "a machine-translated sentence evaluation method and a machine-translated sentence evaluation apparatus that make it possible to evaluate not only translated sentences that are example sentences but also all translated sentences, that have a high reliability in the evaluation, and that reduce the amount of labor". Patent Document 2 discloses that, even in a case in which there is no correct sentence (reference translation), which is required in advance in Non-Patent Document 1, evaluation can be performed using scores of mechanical matching between the backward-translated sentences and the input original sentence. Although Patent Document 2 does not describe learning, use of the scores for the learning is suggested in combination with Non-Patent Document 1.

However, even if Patent Document 2 and Non-Patent Document 1 are combined together, it is still impossible to perform tuning when it is desired to learn the model itself or when the matching score is not proper or is not uniquely determined.

In addition, as in Non-Patent Document 1, even if "the user's utilization result that satisfies requirement 1" is obtained, this result is a result obtained by "generating and utilizing a translated sentence while the user checks, in an easy way, its meaning conveyed to the partner". With respect to how such a result is evaluated as an evaluation value and how model learning is performed using the evaluation value, neither an issue nor a solution is disclosed.

That is, neither an issue nor a solution is disclosed about "generating and utilizing a translated sentence while the user checks, in an easy way, its meaning conveyed to the partner", and neither an issue nor a solution is disclosed about learning using the translated sentence, as in Non-Patent Document 1 described above.

Also, with respect to requirement 3 of "reducing the computer resources and the development cost at the same time requirements 1 and 2 are satisfied", Non-Patent Document 1 requires BLEU value calculation, and Patent Document 2 requires further matching-score calculation, resulting in increases in the computer resources and the development cost.

3) Deep Neural Network Based Model-Acquisition-Type Machine Translation (DNNMT)

In Non-Patent Documents 3 and 4, DNNMT that employs a recurrent neural network (RNN) of a deep neural network (DNN) and a long short term memory (LSTM), which is one variant of RNN, is exemplified as machine translation using a neural network. In either of the schemes, a bilingual corpus is used as correct translation data (positive examples and negative examples) for an input layer and an output layer in a neural network, and an intermediate layer in the neural network is directly learnt to thereby directly construct a translation model in the neural network. In what form a DNN has a translation model therein depends on the type of learning data, the way the learning data is given, the number of times the learning is performed, the network architecture of the DNN itself, and so on. In any case, how the translation performance changes in response to a specific change in the internal state has not been disclosed (has not been academically clarified either). One characteristic of neural networks is essentially that nonlinear outputs can be learnt, but since the nonlinearity has been increasing dramatically with the DNN, a linear causal relationship between some internal parameter and the output performance has not yet been found.

In other words, DNNMT is the same as RBMT and SMT described above in that it returns some translation result with respect to an input sentence. In RBMT, the reason (an underlying rule) why a particular translation result is obtained is known by referring to a database stating a rule therefor, and in SMT, the reason why a particular translation result is obtained is known since it is a result of selection of a translation having the highest probability on the basis of a translation model (such as an occurrence probability of each word or phrase and an alignment probability) and a language model (an n-gram probability). However, in DNNMT, since a neural network itself constructs what corresponds to rules and models, knowledge about the internal model and the operation is not obtained, except for knowledge about the fact that a result output from the output layer in the neural network is a sentence resulting from translation.

Thus, DNNMT has been mainly studied through academic research and has not reached the phase of practical application, and DNNMT has not overcome an issue in terms of actual utilization, such as requirement 1 of "being able to generate and utilize a translated sentence without placing a burden on the user while the user checks, in an easy way, the meaning conveyed to the partner".

Also, with respect to requirement 2 of "being able to automatically perform learning by using the user's utilization results (without placing a further burden on the user)", even if the user's utilization result that satisfies requirement 1 is obtained, internal operations need to be clarified about "how subsequent model learning is performed" using the result, and it goes without saying that any issue has been neither disclosed nor solved thereabout.

In summary, the related art has problems in the following points.

When no translated sentences and no similar usage examples are stated in a bilingual database or when the field thereof is different from a field of interest, there is a possibility that a translated sentence having a significantly low translation accuracy is presented or translation cannot be performed at all.

A method for allowing the user to easily check the contents of translated sentences and select a translated sentence has not been available. Thus, with the method for presenting a backward-translated sentence for an input sentence or presenting the translation quality (the reliability), when the quality or the reliability of the content of a presented translated sentence is low, the user is forced to perform an input again. However, there is no guarantee that the quality improves through the re-input, and thus the user has to perform an input through trial and error.

Although automatic tuning for a translation system based on scores (e.g., BLUE values) mechanically calculated using some method has been disclosed in the preceding examples, neither an issue nor a solution has been disclosed about how to perform evaluation and learning based on a result of the case "a translated sentence is generated and utilized while the user checks, in an easy way, its meaning conveyed to the partner".

It is necessary to have computer resources for generating similar usage examples and data for tuning (e.g., calculating evaluation scores). This requires development and personnel costs for creating the similar usage examples.

Accordingly, in order to improve the functions of the machine translation system, the following measures for improvement have been studied.

One aspect of a machine translation method in a machine translation system is directed to a machine translation method for a machine translation system in which processing for translation between a first language and a second language is performed through connection to an information output device that outputs language information. In the method, a translation-source sentence in a first language is received; a plurality of different forward-translated sentences resulting from translation of the received translation-source sentence into a second language are generated; a plurality of backward-translated sentences resulting from backward translation of the plurality of different forward-translated sentences into the first language are generated; and when an operation for selecting one of the plurality of backward-translated sentences is received during output of the plurality of backward-translated sentences on an information output device, the forward-translated sentence corresponding to the selected backward-translated sentence is output onto the information output device.

For example, the plurality of backward-translated sentences corresponding to the received translation-source sentence are presented to the user, and the forward-translated sentence corresponding to the backward-translated sentence that the user selects from the plurality of backward-translated sentences is presented. Thus, the user selects, from the plurality of backward-translated sentences, the backward-translated sentence that is the closest to the meaning of the translation-source sentence he or she input. Thus, for example, compared with a system in which only one translated sentence resulting from translation of a translation-source sentence input in a first language into a second language and one backward-translated sentence corresponding to the translated sentence are presented, thus reducing the number of scenes in which the translation-source sentence needs to be modified or an input needs to be performed again decreases for the reason that the backward-translated sentence differs from what is meant by the translation-source sentence.

Also, for example, since the user selects one backward-translated sentence from the plurality of backward-translated sentences, the machine translation system can obtain feedback indicating, for example, which backward-translated sentence among the presented plurality of backward-translated sentences is the most appropriate as what is meant by the input translation-source sentence or whether or not what is meant by the input translation-source sentence matches an expression preferred by the user. Thus, for example, when machine learning is applied to the machine translation system in the above-described aspect, the machine translation system obtains an evaluation indicating which backward-translated sentence among the presented plurality of backward-translated sentences is appropriate, in addition to an evaluation indicating whether or not the backward-translated sentence presented with respect to the input translation-source sentence is appropriate. In this case, since feedback on the plurality of backward-translated sentences is obtained by a single translation operation in the machine translation system, it is possible to achieve a high learning efficiency in the machine translation system.

In addition, according to the above-described aspect, for machine learning in the machine translation system, data for learning is generated through backward-translated-sentence selection performed by the user, without a need for evaluating the translation accuracy which involves calculation of BLEU values, evaluation of the translation accuracy which uses scores of mechanical matching between an input translation-source sentence and backward-translated sentences, or the like. Accordingly, it is possible to reduce the development cost without requiring another computer resource to generate the data for learning.

In the above-described aspect, for example, the machine translation system may be connected to a voice input device that receives a voice input performed by a user and a text input device that receives a text input performed by the user. The translation-source sentence may be received in the form of voice information or text information that indicates the translated-target sentence. An output form of the forward-translated sentence corresponding to the selected backward-translated sentence may be changed in accordance with in which of the form of voice information and the form of text information the translation-source sentence is received.

According to this aspect, the form in which the forward-translated sentence is output is changed depending on in which of the form of voice information and the form of text information the translation-source sentence is received. Thus, for example, since the output modal is determined in accordance with the input modal, the user can freely determine the output form by changing the input form.

In the above-described aspect, for example, the information output device may have a sound output device and a display. When the translation-source sentence is received in a form of voice information, the forward-translated sentence corresponding to the selected backward-translated sentence may be output via the sound output device, and when the translation-source sentence is received in a form of text information, the forward-translated sentence corresponding to the selected backward-translated sentence may be output via the display.

According to this aspect, since the form of the input and the form of the output correspond to each other in the same modal, the user may input a translation-source sentence in an output form he or she desires, and no confusion occurs about in which input form he or she should input a translation-source sentence to output a translated sentence in the output form he or she desires.

In the above-described aspect, for example, text information indicating the translation-source sentence may be received as the translation-source sentence, and a plurality of different forward-translated sentences resulting from translation of the translation-source sentence into the second language may be generated based on the text information.

In the above-described aspect, for example, the machine translation system may be further connected to a text input device that receives a text input performed by the user, and text information indicating the translation-source sentence may be received from the text input device as the translation-source sentence.

In the above-described aspect, for example, voice information may be received as the translation-source sentence; voice recognition processing may be performed on the received voice information to generate text information indicating the translation-source sentence; and a plurality of different forward-translated sentences resulting from translation of the translation-source sentence into the second language may be generated based on the text information.

Since this makes it possible to input a translation-source sentence by using voice, for example, it is not necessary to input a translation-source sentence by using a keyboard, a touch panel display, or the like, and thus the user can easily input a translation-source sentence.

In the above-described aspect, for example, the machine translation system may be further connected to a voice input device that receives a voice input performed by the user, and voice information indicating the translation-source sentence may be received from the voice input device as the translation-source sentence.

In the above-described aspect, for example, the information output device may have a display; the plurality of backward-translated sentences may be displayed in a first area on the display; and the translation-source sentence may be displayed in a second area on the display, the second area being different from the first area.

According to the above-described aspect, the area in which the backward-translated sentences are displayed and the area in which the translation-source sentence is displayed are divided. Since both the backward-translated sentences and the translation-source sentence are sentences in the language, the user can easily distinguish which of the sentences is a backward-translated sentence and which of the sentences is the translation-source sentence and will not be confused.

In the above-described aspect, for example, the forward-translated sentence corresponding to the selected backward-translated sentence may be displayed in a third area on the display.

With this arrangement, since the backward-translated sentences, the translation-source sentence, and the forward-translated sentences are displayed in corresponding different areas, it is easy for the user to determine the type of each sentence.

In the above-described aspect, for example, the direction of display of the forward-translated sentence corresponding to the selected backward-translated sentence may be changed in accordance with an operation performed on the information output device.

With this arrangement, for example, during face-to-face conversion between users A and B who speak different languages, when the direction of a forward-translated sentence displayed on the information output device, the forward-translated sentence being output in a language spoken by user B in response to a translation-source sentence input in a language spoken by user A, can be changed, for example, in an opposite direction, user A does not have to convey the content of the forward-translated sentence to user B, for example, by reading out the forward-translated sentence or changing the direction of the information output device. Thus, two people facing each other can perform communicate between two different languages by looking down at the information output device.

In the above-described aspect, for example, the direction of the forward-translated sentence that is displayed may be changed to a direction that is different from the plurality of backward-translated sentences displayed in the first area.

In the above-described aspect, for example, the direction of the forward-translated sentence that is displayed may be changed to the direction that is the same as the direction of the plurality of backward-translated sentences displayed in the first area.

In the above-described aspect, for example, the forward-translated sentence corresponding to the selected backward-translated sentence may be displayed in a direction that is different from the direction of the plurality of backward-translated sentences displayed in the first area.

In the above-described aspect, for example, in the machine translation system, a forward-translated sentence group that is a collection of forward-translated sentences resulting from translation of the received translation-source sentence into the second language may be generated, the forward-translated sentence group including the plurality of different forward-translated sentences; a determination may be made as to into which of an interrogative sentence, an affirmative form, a negative form, and an imperative form each of the forward-translated sentences included in the forward-translated sentence group is classified; and the plurality of different forward-translated sentences may be determined in the forward-translated sentence group, based on the classified form.

According to the above-described aspect, since the plurality of different forward-translated sentences are selected from the forward-translated sentence group, based on the form of each sentence, for example, only a forward-translated sentence whose form is the same as the form of the translation-source sentence can be selected from a forward-translated sentence group mechanically generated based on a translation-source sentence, thereby making it possible to improve the final translation accuracy. For example, a plurality of forward-translated sentences including a forward-translated sentence whose form is different from the form of the translation-source sentence may be selected, thereby making it possible to increase variations of the plurality of backward-translated sentences that are generated based on the forward-translated sentences and that are presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of different forward-translated sentences may include at least two forward-translated sentences classified into the respective different forms.

This makes it possible to increase variations of the plurality of backward-translated sentences that are generated based on forward-translated sentences and that are presented to the user. Accordingly, for example, it is possible to prevent the machine translation system during machine learning from learning that, when the user selects one of backward-translated sentences having similar contents and the unselected backward-translated sentence represents what is meant by the translation-source sentence input by the user, the unselected backward-translated sentence is a wrong backward-translated sentence since it is not selected.

In the above-described aspect, for example, in the machine translation system, a forward-translated sentence group that is a collection of forward-translated sentences resulting from translation of the received translation-source sentence into the second language may be generated, the forward-translated sentence group including the plurality of different forward-translated sentences; subjects or predicates in the respective forward-translated sentences included in the forward-translated sentence group may be determined; and the plurality of different forward-translated sentences may be determined in the forward-translated sentence group, based on the determined subjects or predicates.

According to the above-described aspect, since a plurality of different forward-translated sentences are selected from the forward-translated sentence group, based on the subjects or predicates, for example, only a forward-translated sentence having the same subject or predicate as that of the translation-source sentence can be selected from a forward-translated sentence group mechanically generated based on the translation-source sentence, thereby making it possible to improve the final translation accuracy. For example, a plurality of forward-translated sentences including a forward-translated sentence having a subject or predicate different from that of the translation-source sentence may be selected, thereby making it possible to increase variations of the plurality of backward-translated sentences that are generated based on the forward-translated sentences and that are presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of different forward-translated sentences may include at least two forward-translated sentences determined to include respective different predicates or subjects.

This makes it possible to increase variations of the plurality of backward-translated sentences that are generated based on the forward-translated sentences and that are presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of different forward-translated sentences may be forward-translated sentences determined to include the same subject or predicate.

With this arrangement, for example, only a forward-translated sentence having the same subject or predicate as that of the translation-source sentence can be selected from a forward-translated sentence group mechanically generated based on the translation-source sentence, thereby making it possible to improve the final translation accuracy.

In the above-described aspect, for example, in the machine translation system, a backward-translated sentence group that is a collection of at least one backward-translated sentence generated for each of the plurality of different forward-translated sentences may be generated, the backward-translated sentence group including the plurality of backward-translated sentences; evaluation values may be calculated by evaluating similarities between the translation-source sentence and the backward-translated sentences included in the backward-translated sentence group; and the plurality of backward-translated sentences may be selected from the backward-translated sentence group, based on the evaluation values.

According to the above-described aspect, since a plurality of different backward-translated sentences are selected from the backward-translated sentence group, based on the similarity to the translation-source sentence, for example, a backward-translated sentence having a high similarly to the translation-source sentence can be selected, and it is possible to improve the final translation accuracy. Also, for example, a plurality of backward-translated sentences including a backward-translated sentence having a low similarity to the translation-source sentence may be selected, thereby making it possible to increase variations of the plurality of backward-translated sentences presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, in the machine translation system, a backward-translated sentence group that is a collection of at least one backward-translated sentence generated for each of the plurality of different forward-translated sentences may be generated, the backward-translated sentence group including the plurality of backward-translated sentences; a determination may be made as to into which of an interrogative sentence, an affirmative form, a negative form, and an imperative form each of the backward-translated sentences included in the backward-translated sentence group is classified; and the plurality of backward-translated sentences may be selected from the backward-translated sentence group, based on the classified forms.

According to the above-described aspect, since the plurality of different backward-translated sentences are selected from the backward-translated sentence group, based on the form of each sentence, for example, only a backward-translated sentence having the same form as that of the translation-source sentence can be selected from the backward-translated sentence group, thereby making it possible to improve the final translation accuracy. Also, for example, a plurality of backward-translated sentences including a backward-translated sentence whose form is different from the form of the translation-source sentence may be selected, thereby making it possible to increase variations of a plurality of backward-translated sentences to be presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of backward-translated sentences may include at least two backward-translated sentences classified into the respective different forms.

This makes it possible to increase variations of a plurality of backward-translated sentences to be presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, in the machine translation system, a backward-translated sentence group that is a collection of at least one backward-translated sentence generated for each of the plurality of different forward-translated sentences may be generated, the backward-translated sentence group including the plurality of backward-translated sentences; subjects or predicates of the respective backward-translated sentences included in the backward-translated sentence group may be determined; and the plurality of backward-translated sentences may be selected from the backward-translated sentence group, based on the determined subjects or predicates.

According to the above-described aspect, since the plurality of different backward-translated sentences are selected from the backward-translated sentence group, based on the subjects or predicates, for example, only a backward-translated sentence having the same subject or predicate as that of the translation-source sentence can be selected from the backward-translated sentence group, thereby making it possible to improve the final translation accuracy. Also, for example, a plurality of backward-translated sentences including a backward-translated sentence having a subject or predicate different from that of the translation-source sentence may be selected, thereby making it possible to increase variations of a plurality of backward-translated sentences to be presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of backward-translated sentences may include at least two backward-translated sentences determined to include respective different predicates or subjects.

This makes it possible to increase variations of a plurality of backward-translated sentences to be presented to the user. Accordingly, for example, it is possible to prevent the machine translation system during machine learning from learning that, when the user selects one of backward-translated sentences having similar contents and any of the unselected backward-translated sentence represents what is meant by the translation-source sentence input by the user, the unselected backward-translated sentence is a wrong backward-translated sentence since it is not selected.

In the above-described aspect, for example, the plurality of backward-translated sentences are backward-translated sentences determined to include the same subject or predicate.

With this arrangement, for example, only a backward-translated sentence having the same subject or predicate as that of the translation-source sentence can be selected from the backward-translated sentence group, thereby making it possible to improve the final translation accuracy.

In the above-described aspect, for example, in the machine translation system, a probability model to be referred to may be managed, machine learning may be applied, and the machine learning may be performed based on information indicating which of the plurality of backward-translated sentences is the selected backward-selected sentence, to update a parameter of the probability model.

According to the above-described aspect, based on the information indicating which of the plurality of backward-translated sentences is the selected backward-selected sentence, the machine learning is performed to update a parameter of the probability model. With this arrangement, since the information indicating which backward-translated sentence among the plurality of backward-translated sentences presented with respect to the translation-source sentence was selected is reflected in the system, the translation accuracy can be improved through use of the machine translation system.

In the above-described aspect, for example, the probability model may include weight values given to respective words or phrases used in the translation. In the machine translation system, a word or a phrase included in a selected forward-translated sentence may be compared with a word or a phrase included in an unselected forward-translated sentence, the selected forward-translated sentence being the forward-translated sentence corresponding to the selected backward-translated sentence, and the unselected forward-translated sentence being the forward-translated sentence corresponding to each backward-translated sentence other than the selected backward-translated sentence; the weight values may be updated by applying a method for updating the weight value for the word or the phrase included in only the selected forward-translated sentence, a method for updating the weight value for the word or the phrase included in only the unselected forward-translated sentence, and a method for updating the weight value for the word or the phrase included in both the selected forward-translated sentence and the unselected forward-translated sentence, the updating methods being different from each other; and the machine learning may be performed by using, as teacher data, the updated weight values and the words or the phrases corresponding to the updated weight values.

With this arrangement, for example, a difference can be given between a score for a word or phrase included in the selected forward-translated sentence and a score for a word or phrase not included in the selected forward-translated sentence to perform machine learning. Thus, even for a word or phrase included in the unselected forward-translated sentence, there are cases in which a positive evaluation is obtained during update of the weight value. Accordingly, when a partly correct translation is performed in the unselected forward-translated sentence, this part can be correctly evaluated, and the evaluation result of the user can be reflected.

In addition, through machine learning, it is possible to performing learning while sequentially reflecting, for each word or phrase, the selection result of the user into the probability model, thereby making it possible to improve the translation accuracy.

In the above-described aspect, for example, the probability model may include weight values given to respective words or phrases used in the translation. In the machine translation system, the probability model may include weight values given to respective words or phrases used in the translation. Aa word or a phrase included in the selected backward-translated sentence is compared with a word or a phrase included in an unselected backward-translated sentence that is each backward-translated sentence other than the selected backward-translated sentence; the weight values may be updated by applying a method for updating the weight value for the word or the phrase included in only the selected backward-translated sentence, a method for updating the weight value for the word or the phrase included in only the unselected backward-translated sentence, and a method for updating the weight value for the word or the phrase included in both the selected backward-translated sentence and the unselected backward-translated sentence, the updating methods being different from each other; and the machine learning may be performed by using, as teacher data, the updated weight values and the words or the phrases corresponding to the updated weight values.

With this arrangement, for example, a difference can be given between a score for a word or phrase included in the selected backward-translated sentence and a score for a word or phrase not included in the selected selected-translated sentence to perform machine learning. Thus, even for a word or phrase included in the unselected backward-translated sentence, there are cases in which a positive evaluation is obtained during update of the weight value. Accordingly, when a partly correct translation is performed in the unselected backward-translated sentence, this part can be correctly evaluated, and the evaluation result of the user can be reflected.

In addition, through machine learning, it is possible to performing learning while sequentially reflecting, for each word or phrase, the selection result of the user into the probability model, thereby making it possible to improve the translation accuracy.

In the above-described aspect, for example, in the machine translation system, a word or a phrase included in the selected backward-translated sentence may be compared with a word or a phrase included in an unselected backward-translated sentence that is each backward-translated sentence other than the selected backward-translated sentence; and the weight values may be updated by applying a method for updating the weight value for the word or the phrase included in only the selected backward-translated sentence, a method for updating the weight value for the word or the phrase included in only the unselected backward-translated sentence, and a method for updating the weight value for the word or the phrase included in both the selected backward-translated sentence and the unselected backward-translated sentence, the updating methods being different from each other; and the machine learning may be performed by using, as teacher data, the updated weight values and the words or the phrases corresponding to the updated weight values.

In the above-described aspect, for example, the weight value may be a value for a positive example for the word corresponding to only the selected backward-translated sentence or may be a value for a negative example for the word corresponding to only a backward-translated sentence other than the selected backward-translated sentence.

With this arrangement, both a positive evaluation and a negative evaluation can be reflected in the weight value.

In the above-described aspect, for example, the machine learning may employ at least one of reinforcement learning, discriminative learning, and neural network learning.

In another aspect, there is provided an apparatus including a processor and a memory having a computer program stored thereon. The computer program causes the processor to execute operations including: receiving an input of a translation-source sentence in a first language; generating a forward-translated sentences resulting from translation of the translation-source sentence into a second language and a backward-translated sentence resulting from backward translation of the forward-translated sentence into the first language; outputting the backward-translated sentence and the forward-translated sentence; and receiving an input performed by a user. In the generating, a plurality of different forward-translated sentences are generated for the translation-source sentence, and a plurality of backward-translated sentences corresponding to the different forward-translated sentences are generated; and in the outputting, during output of the plurality of backward-translated sentences, when an input for selecting one of the plurality of backward-translated sentences is received in the inputting, the forward-translated sentence corresponding to the selected backward-translated sentence is output.

In yet another aspect, there is provided a non-transitory recording medium having a computer program stored thereon. The computer program causes a processor to execute operations including: receiving a translation-source sentence in a first language; generating a plurality of different forward-translated sentences resulting from translation of the received translation-source sentence into a second language; generating a plurality of backward-translated sentences resulting from backward translation of the plurality of different forward-translated sentences into the first language; and outputting, upon receiving an operation for selecting one of the plurality of backward-translated sentences during display of the plurality of backward-translated sentences on the information output device, the forward-translated sentence resulting from translation of the selected backward-translated sentence into the second language onto the information output device.

Embodiments

Embodiments of the present disclosure will be described below with reference to the accompanying drawings.

The following description in the embodiments has a portion in which a source language, which is a language before translation is performed, is Japanese and a target language, which is a language after the translation is performed, is English. However, these are examples, and the pair of the source language and the target language may be a pair of any combination of languages.

Herein, a translated sentence resulting from translation of the source language into the target language is referred to as a "forward-translated sentence", and a translated sentence resulting from translation of the target language into the source language is referred to as a "backward-translated sentence".

Also, a backward-translated sentence presented to a user is referred to as a "user presentation sentence", a sentence selected by a user is referred to as a "(user) selected sentence", and a backward-translated sentence not selected by a user is referred to as a "(user) unselected sentence".

FIG. 1 is a diagram illustrating one example of an overall configuration of a system in the present embodiment. The system includes an information display terminal 100, a network 200, a translation server 300, a microphone 400, and a speaker 500. Examples of the information display terminal 100 include a smartphone, a tablet terminal, a dedicated display equipment terminal, and a personal computer (PC). Other than these terminals, the information display terminal 100 may be implemented by any terminal that can exchange information with the user.

An input operation that the user performs on the information display terminal 100 is assumed to be an input using text, an input using voice, or the like. For an input using text, possible examples include an input using a touch panel and an input using a keyboard. Also, when the input operation is an input using voice, the input may be, for example, an input using a microphone. In addition, for example, an input by a gesture may be used.

During output of a machine translation result or the like, the information display terminal 100 may output the result via a display or using sound.

The information display terminal 100, the translation server 300, the microphone 400, and the speaker 500 are connected to the network 200. The method for the connection is, for example, a wired or wireless local area network (LAN) connection, but is not limited thereto, as long as it provides connections between the information display terminal 100, the translation server 300, the microphone 400, and the speaker 500 so that they can communicate with each other.

The translation server 300 performs machine translation processing on a sentence to be translated, the sentence being received from the information display terminal 100 (this sentence is herein referred to as a "translation-source sentence"). For example, the translation server 300 receives a source-language character string input from the information display terminal 100 and performs machine translation processing on the source-language character string. The translation server 300 also have a function for performing machine learning upon receiving feedback from the user about a machine translation result. A detailed configuration of the translation server 300 is described later.

For example, the present embodiment may also be realized by integrating the information display terminal 100 and the translation server 300.

The microphone 400 performs a voice input on a machine translation system. The microphone 400 may be attached to the information display terminal 100 or may have a function for connecting to the network 200 on its own. When a voice input is not performed on the machine translation system, the microphone 400 is not essential.

In the machine translation system, the speaker 500 performs an output using sound. The speaker 500 may be attached to the information display terminal 100 or may have a function for connecting to the network 200 on its own. When a sound output is not performed on the machine translation system, the speaker 500 is not essential.

An input/output modality of the machine translation system may have one of an input/output using voice or sound and an input/output using text or may have both thereof. When the user performs an input using voice on the machine translation system, an output using sound is performed. Also, when the user performs an input in a text format, an output using text (screen display) is performed.

Figure 2:
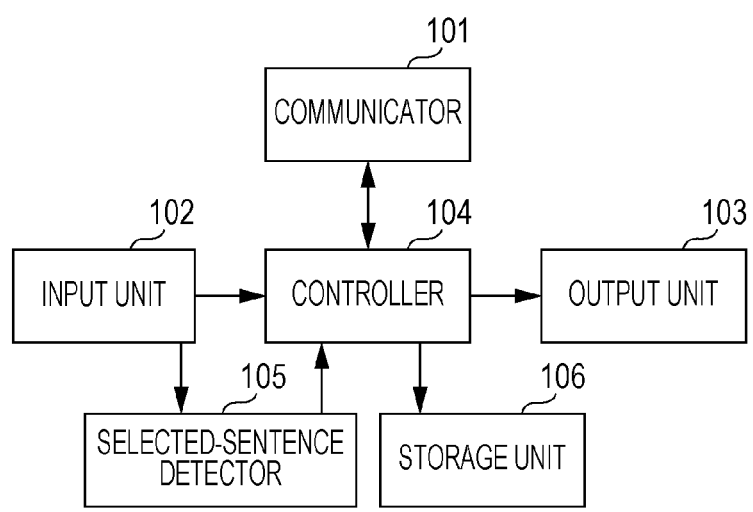
FIG. 2 is a block diagram illustrating the configuration of an information display terminal in the present embodiment.

FIG. 2 is a block diagram illustrating the configuration of the information display terminal 100 in the present embodiment.

The information display terminal 100 includes a communicator 101, an input unit 102, an output unit 103, a controller 104, a selected-sentence detector 105, and a storage unit 106.

The communicator 101 communicates with the translation server 300 to perform, for example, transmission of a translation-source sentence input at the information display terminal 100 and reception of a translated sentence and a backward-translated sentence, which are described below. The communicator 101 not only transmits/receives those pieces of information but also transmits/receives various types of information to/from the translation server 300.

The input unit 102 receives an input from the user. The input unit 102 receives an input, such as an input of a translation-source sentence or an input of a selected backward-translated sentence, which is described below. Possible forms of the input include a voice input and an input in a text format. When a voice input is used, voice recognition processing is performed on a translation-source sentence input using voice, and a character string output as a result of the voice recognition processing is input to the machine translation system as an input sentence. When an input in a text format is used, the input unit 102 receives an input including a character string via a keyboard, a mouse, a touch panel, or the like.

The output unit 103 outputs the translation-source sentence input using the input unit 102, a plurality of backward-translated sentences received via the communicator 101, a translation result, and so on. The output unit 103 may be implemented as a display unit, such as a display, that executes screen display, and is, for example, a touch panel display or a monitor used in a smartphone, a tablet terminal, or the like. The output unit 103 may be implemented as an audio output unit, such as a speaker, that outputs sound. The controller 104 controls the operations of the communicator 101, the input unit 102, the output unit 103, the controller 104, the selected-sentence detector 105, and the storage unit 106.

The selected-sentence detector 105 detects which backward-translated sentence the user has selected from a plurality of backward-translated sentences output by the output unit 103. For example, when an input indicating that one backward-translated sentence is selected from a plurality of backward-translated sentences is input to the input unit 102, the selected-sentence detector 105 detects user selection information indicating which backward-translated sentence was selected. The detected user selection information is transmitted to the translation server 300 via the communicator 101. Information output from the output unit 103 may be controlled based on the user selection information. For example, when the output unit 103 is implemented by a display, control may be performed so that a backward-translated sentence selected by the user is displayed in a highlighted manner or control may be performed so that a backward-translated sentence not selected by the user is deleted from the display screen.

Herein, a backward-translated sentence selected by the user and a forward-translated sentence corresponding to the selected backward-translated sentence may be referred to as "user selected sentences". Also, a backward-translated sentence not selected by the user and a forward-translated sentence corresponding to the unselected backward-translated sentence may be referred to as "user unselected sentences".

The storage unit 106 temporarily stores information received from the translation server 300, various application programs executed in the information display terminal 100, and so on.

Figure 3:
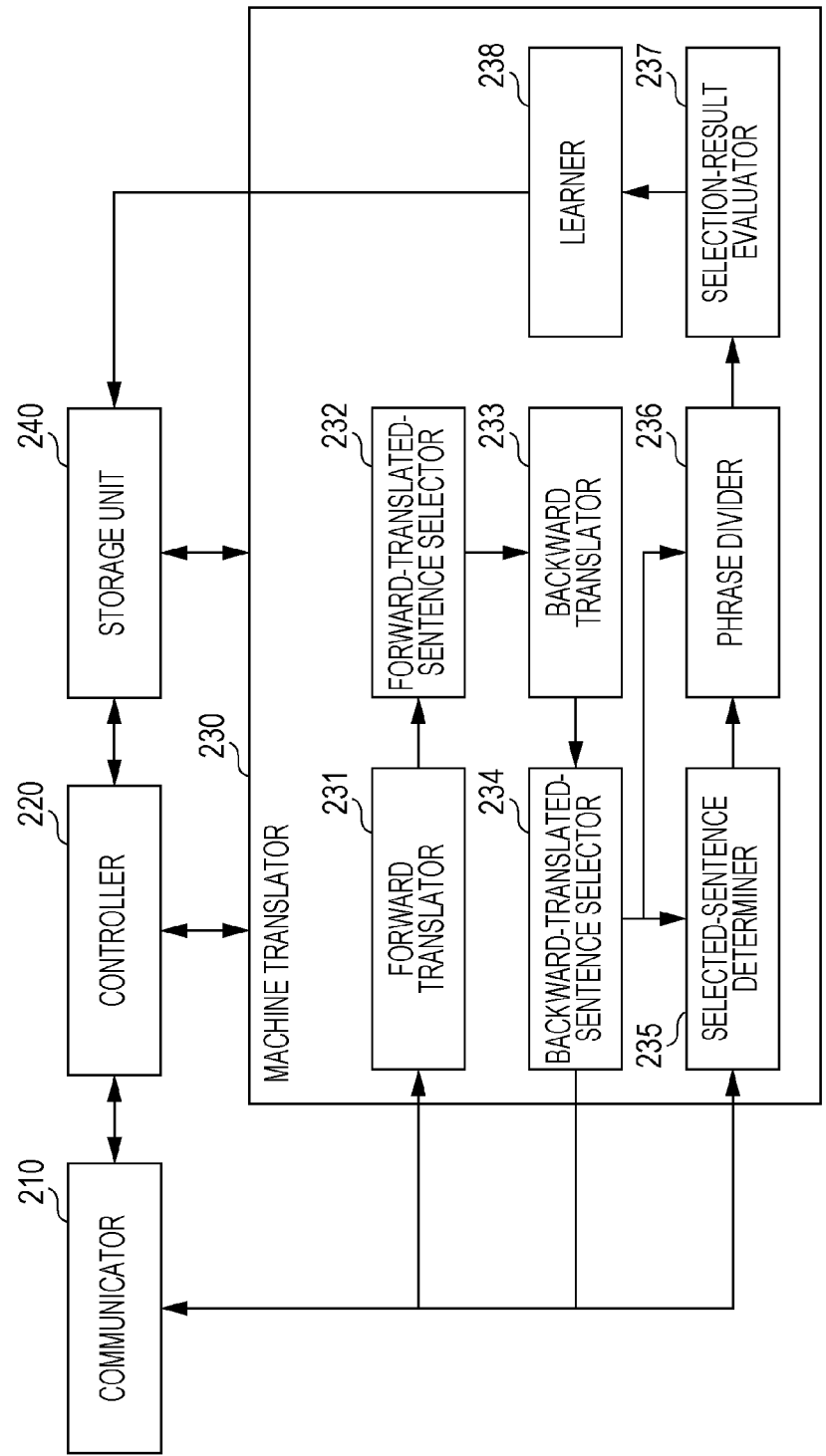
FIG. 3 is a block diagram illustrating the configuration of a translation server in the present embodiment.

FIG. 3 is a block diagram illustrating the configuration of the translation server 300 in the present embodiment. The translation server 300 includes a communicator 210, a controller 220, a machine translator 230, and a storage unit 240. The machine translator 230 includes a forward translator 231, a forward-translated-sentence selector 232, a backward translator 233, a backward-translated-sentence selector 234, a selected-sentence determiner 235, a phrase divider 236, a selection-result evaluator 237, and a learner 238.

The communicator 210 communicates with the information display terminal 100 to perform, for example, reception of a translation-source sentence input at the information display terminal 100 and transmission of a translated sentence and a backward-translated sentence, which are described below. The communicator 210 not only transmits/receives these pieces of information but also transmits/receives various types of information to/from the information display terminal 100.

The controller 220 controls the operations of the communicator 210, the machine translator 230, and the storage unit 240.

The storage unit 240 stores therein a phrase table to which the machine translator 230 refers during various types of translation processing, phrase division processing, or the like. The phrase table is described later.

The machine translator 230 executes machine translation processing on a translation-source sentence received via the communicator 210. The machine translator 230 performs machine translation, such as rule-based machine translation (RBMT), statistical machine translation (SMT), or deep neural network based model-acquisition-type machine translation (DNNMT). The machine translator 230 evaluates a translation result to obtain scores, such as automatic evaluation scores (such as scores resulting from BLEU) or internal scores (such as scores resulting from manual evaluation).

Figure 11:
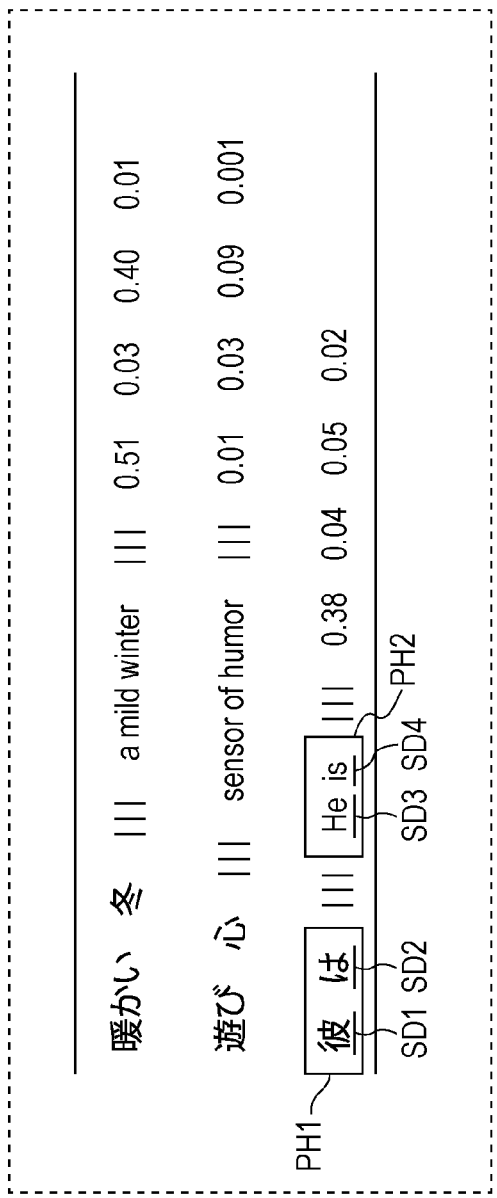
FIG. 11 illustrates an example of a typical phrase table in the present embodiment.

In order that a result selected by the user is reflected in machine learning, a phrase table, which shows pairs of phrases like those illustrated in FIG. 11, is prepared as needed, depending on the translation scheme.

Since the rule-based machine translation (RBMT) is performed based on manually constructed conversion rules (pairs of original and translated words stored as a database), there is a possibility that a phrase table like that illustrated in FIG. 11 is not held. However, when a bilingual database exists in units of phrases or words, a learning result may be reflected in the bilingual database or a phrase table may be additionally prepared.

For statistical machine translation (SMT), since a phrase table like that illustrated in FIG. 11 is held, the phrase table may be used.

In deep neural network based model-acquisition-type machine translation (DNNMT), since a model itself is automatically constructed, no phrase table is held in many cases. Thus, a phrase table may be additionally prepared.

In addition, the target into which the user's selection is reflected as a learning result is not limited to such a phrase table, and the user's selection may also be reflected in a database that shows pairs of restatements in the source language. Details of the machine translation processing are described later.

The forward translator 231 executes machine translation processing for translation from the language (source language) of the translation-source sentence, received via the communicator 210, into a language (target language) output as a result of the translation of the translation-source sentence. Herein, translation from the source language into the target language is referred to as "forward translation", and a translated sentence obtained by the forward translation is referred to as a "forward-translated sentence". In this case, as a result of the forward translation processing, a plurality of forward-translated sentences are generated for a translation-source sentence. The forward translator 231 performs machine translation processing by referring to the phrase table stored in the storage unit 240. A plurality of forward-translated sentences generated by the forward translator 231 may be referred to as a "forward-translated sentence group". The forward translator 231 outputs the generated forward-translated sentence group to the forward-translated-sentence selector 232.

The forward-translated-sentence selector 232 performs forward-translated-sentence selection processing for selecting N forward-translated sentences from the forward-translated sentence group generated by the forward translator 231. Details of the forward-translated-sentence selection processing are described later. The forward-translated-sentence selector 232 outputs the selected N forward-translated sentences to the backward translator 233.

With respect to each of the N forward-translated sentences selected by the forward-translated-sentence selector 232, the backward translator 233 executes machine translation processing for translation from the language (target language) of the forward-translated sentence into the language (source language) of the translation-source sentence. Herein, translation from the target language into the source language is referred to as "backward translation", and a translated sentence obtained by the backward translation is referred to as a "backward-translated sentence". In this case, as a result of the backward translation processing, one or more backward-translated sentences are generated for each forward-translated sentence. As a result, a plurality of backward-translated sentences are generated. The backward translator 233 also performs machine translation processing by referring to the phrase table stored in the storage unit 240. A plurality of backward-translated sentences generated by the backward translator 233 is referred to as a "backward-translated sentence group". The backward translator 233 outputs the generated backward-translated sentence group to the backward-translated-sentence selector 234.

The backward-translated-sentence selector 234 performs backward-translated-sentence selection processing for selecting M backward-translated sentences from the backward-translated sentence group generated by the backward translator 233. The backward-translated-sentence selection processing is described later. The backward-translated-sentence selector 234 transmits the selected M backward-translated sentences to the information display terminal 100 via the communicator 210. The output unit 103 in the information display terminal 100 outputs the M backward-translated sentences in a selectable manner.

On the basis of user selection information received from the information display terminal 100 via the communicator 210, the selected-sentence determiner 235 determines which of the backward-translated sentences the user selected from the M backward-translated sentences selected by the backward-translated-sentence selector 234. The selected-sentence determiner 235 then outputs information resulting from the determination to the phrase divider 236.

With respect to each of the backward-translated sentences input from the backward-translated-sentence selector 234, the phrase divider 236 divides the backward-translated sentence into phrases or words. The phrase divider 236 also divides a forward-translated sentence corresponding each backward-translated sentence into phrases or words. In this case, additionally, information indicating which of the backward-translated sentences input from the selected-sentence determiner 235 was selected may also be used. The phrase table stored in the storage unit 240 may also be used. Information obtained by dividing each backward-translated sentence and each forward-translated sentence into phrases or words and the user selection information are output to the selection-result evaluator 237.

Although a phrase table showing correspondences in units of phrases or words in two languages, like those shown in statistical machine translation (SMT), is used in the phrase division, the phrase table that is used does not necessarily have to be a predetermined phrase table and may be any table analogous thereto. When a phrase table is used in the machine translation, it may be used to perform the phrase division. Alternatively, an additionally prepared phrase table or the like may be used, or any bilingual dictionary or the like may be used.

On the basis of the information input from the phrase divider 236, the selection-result evaluator 237 evaluates the forward-translated sentence and the backward-translated sentence. In this case, the selection-result evaluator 237 may perform different evaluations on the user selected sentence and the user unselected sentence on the basis of the user selection information. A detailed evaluation method is described later. The selection-result evaluator 237 outputs evaluation information resulting from the evaluation of the forward-translated sentence and the backward-translated sentence to the learner 238.

On the basis of the evaluation information input from the selection-result evaluator 237, the learner 238 updates the phrase table stored in the storage unit 240 to thereby perform machine learning in the machine translation processing. That is, the learner 238 reflects the evaluation information into the phrase table. A table for the machine learning may be a phrase table referred to by the forward translator 231 or may be a phrase table referred to by the backward translator 233. Also, the evaluation information does not necessarily have to be reflected in the phrase table, and for example, the result may be reflected in a restatement dictionary, a word dictionary, or the like to perform machine learning in the machine translation processing. A detailed method for reflecting the evaluation information into the phrase table is described later.

Figure 4:
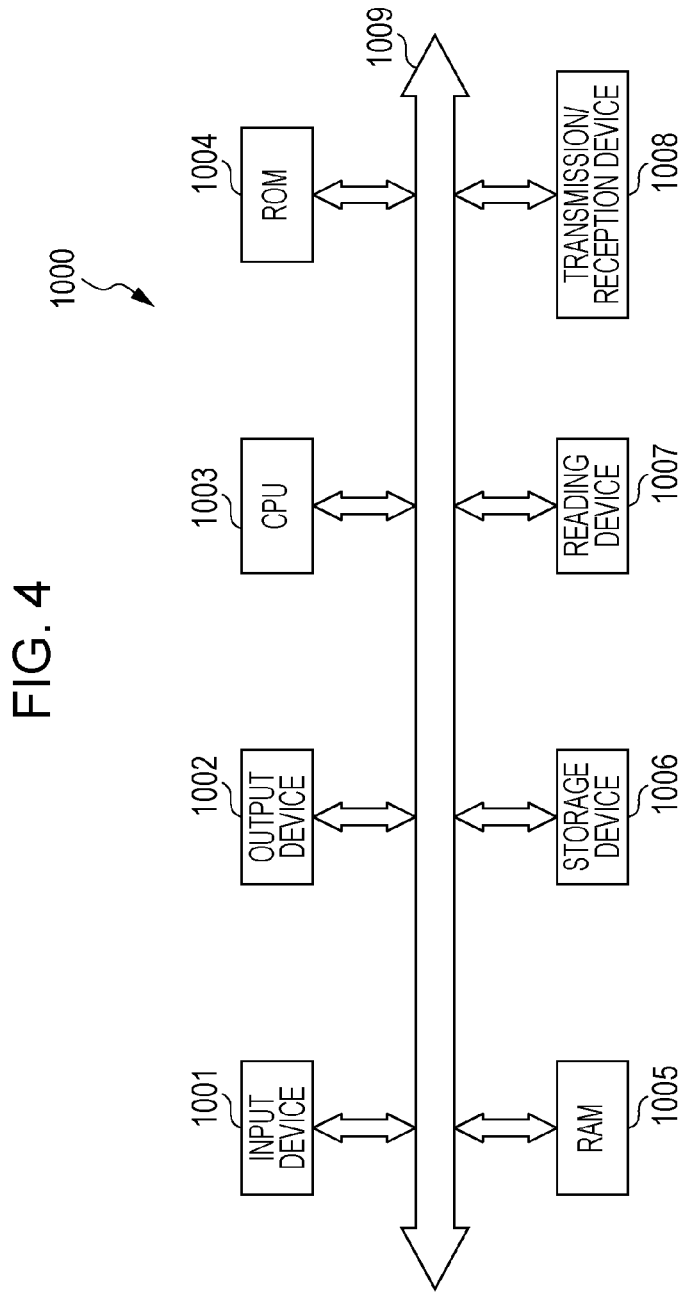
FIG. 4 is a diagram illustrating the hardware configuration of the information display terminal in the present embodiment.

FIG. 4 is a diagram illustrating the hardware configuration of a computer for realizing the functions of individual constituent elements of the information display terminal by using a program. This computer 1000 includes an input device 1001, an output device 1002, a central processing unit (CPU) 1003, a read only memory (ROM) 1004, and a random access memory (RAM) 1005. Examples of the input device 1001 include an input button and a touch pad, and examples of the output device 1002 include a display and a speaker. The computer 1000 may further include a storage device 1006, a reading device 1007 that reads information from a recording medium, and a transmission/reception device 1008 that performs communication through a network. Examples of the storage device 1006 include a hard-disk device and a solid state drive (SSD), and examples of the recording medium include a digital versatile disc read-only memory (DVD-ROM) and a Universal Serial Bus (USB) memory. The above-described individual constituent elements are connected to each other through a bus 1009.

The reading device 1007 reads a program for realizing the functions of the above-described individual constituent elements from a recording medium on/in which the program is recorded and causes the storage device 1006 to store the program. Alternatively, the transmission/reception device 1008 performs communication with a server apparatus connected to the network and causes the storage device 1006 to store a program for realizing the functions of the above-described constituent elements, the program being downloaded from the server apparatus.

The CPU 1003 then copies the program stored in the storage device 1006 to the RAM 1005, sequentially reads instructions included in the program from the RAM 1005, and executes the instructions to thereby realize the functions of the above-described constituent elements. Also, during execution of the program, information obtained by the various types of processing described in each embodiment is stored in the RAM 1005 or the storage device 1006 and is used, as appropriate.

Figure 5:
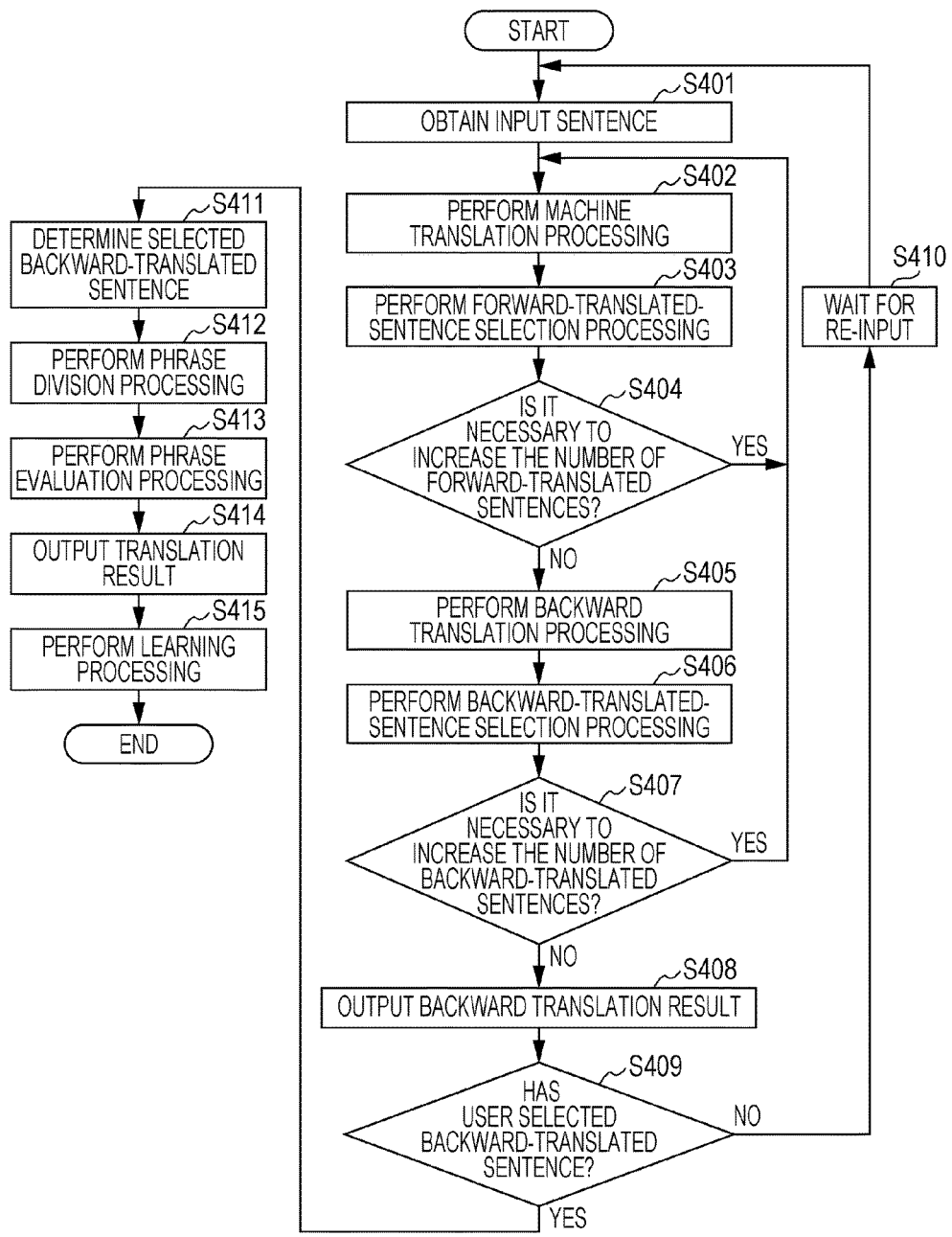
FIG. 5 is a flowchart illustrating the operation of the machine translation system in the present embodiment.

FIG. 5 is a flowchart illustrating the operation of the machine translation system in the present embodiment. For simplicity of description, it is assumed that, in the flowchart, the input unit 102 and the output unit 103 of the information display terminal 100 are implemented by a touch panel display. An input from the user, a translation result, and so on are output via the touch panel display of the information display terminal 100. For example, the input unit 102 and the output unit 103 may be independent from each other, like the keyboard and the display. Input/output may be performed using voice and sound. For convenience of description, the following description includes a portion in which the source language (the native language) and the target language are assumed to be Japanese and English, respectively. However, these are exemplary, and any combination of a source language and a target language may be used.

First, in step S401, a translation-source sentence input by a user is obtained. In step S402, machine translation processing is performed on the translation-source sentence. The machine translation processing in this case is forward translation processing for translating the translation-source sentence in the source language into a character string (a forward-translated sentence) in the target language. In this case, for example, in statistical machine translation (SMT), the likelihood of the translation is represented by scores, based on a translation model and a language model. The translation model refers to a statistical model that defines the probability of translated words, and the language model refers to a statistical model that defines the probability of arrangement of words in the output language. Based on the two models, the likelihood of the translation is represented by scores, and translation results are output in the order of the scores, so that a plurality of forward-translated sentences are generated. The plurality of forward-translated sentences is referred to as a "forward-translated sentence group", for convenience of description.

Since specific processing for the machine translation in the present embodiment is typical machine translation processing, a description thereof is not given hereinafter.

In step S403, N forward-translated sentences are selected from the forward-translated sentence group, based on a predetermined criterion. For example, N forward-translated sentences may be selected in descending order of evaluation scores given to the respective forward-translated sentences included in the forward-translated sentence group. The N forward-translated sentences may be randomly selected, regardless of the evaluation scores. Considering what are meant by the forward-translated sentences included in the forward-translated sentence group, the N forward-translated sentences may be selected so that they do not include forward-translated sentences having substantially the same meaning. Also, when the number of forward-translated sentences having different meanings, the forward-translated sentences included in the forward-translated sentence group, is small, processing for adding a forward-translated sentence having a different meaning may be performed, as appropriate. A detailed method for selecting the forward-translated sentences is described later with reference to FIG. 6.

After the process in steps S403 is performed, if it is determined that it is necessary to increase the number of forward-translated sentences (YES in S404), the flow returns to step S402, and the forward translation processing is executed again. At this point in time, in order to obtain a forward-translated sentence that is different from the already obtained forward-translated sentences, a forward-translated sentence having a score lower than the previous scores is selected. Another translation measure (e.g., rank-based intuitive bilingual evaluation score (RIBES) may be used. When a database of restatements in the source language is held, a similar sentence can be created through use of the database for an input sentence and can be subjected to the forward translation processing again. Although this approach differs superficially, a sentence having the same meaning as that of the input sentence is input, and thus a different forward-translated sentence can be obtained.

After the forward translation processing is executed again, when the forward-translated-sentence selection processing is executed in step S403, forward-translated sentences may be selected based on a criterion different from the previous criterion or may be selected based on the same criterion as the previous criterion.

After the process in step S403 is performed, if it is determined that it is not necessary to increase the number of forward-translated sentences (NO in S404), the flow proceeds to backward translation processing in step S405. In step S405, the backward translation processing is executed to perform backward translation on the N forward-translated sentences obtained in step S403. When translation from the source language into the target language is assumed to be forward translation, the backward translation is translation in the opposite direction, that is, is translation from the target language into the source language. Backward translation processing for generating an arbitrary number of backward-translated sentences is performed for each of the N forward-translated sentences. The "backward translation processing for generating an arbitrary number of backward-translated sentences" means, for example, backward translation processing for generating backward-translated sentences that correspond to the N forward-translated sentences on a one-to-one basis, backward translation processing that is performed on some of the N forward-translated sentences, and backward translation processing for generating a plurality of backward-translated sentences for one forward-translated sentence. As a result of the backward translation processing, a plurality of backward-translated sentences are generated. This plurality of backward-translated sentences is referred to as a "backward-translated sentence group", for convenience of description.

What criterion is used to output the backward-translated sentences may be determined by some criterion in the system or may be determined by the user. The "criterion in the system" is that, for example, the backward translation processing is not performed on a forward-translated sentence for which a score is low (i.e., the number of backward-translated sentences generated for one forward-translated sentence is 0), the score being calculated using BLEU-based evaluation, manual evaluation, or the like, and an arbitrary number of backward-translated sentences is obtained for a forward-translated sentence for which the score is high (i.e., a plurality of backward-translated sentences are generated for one forward-translated sentence). When the user determines the number of f backward-translated sentences, for example, he or she may set how many backward-translated sentences are to be generated for one forward-translated sentence, but the present disclosure is not limited thereto.

The processing in step S406 is backward-translated-sentence selection processing for selecting M backward-translated sentences from the backward-translated sentence group obtained in step S405. In the backward-translated-sentence selection processing, processes that are substantially the same as or similar to the processes in the forward-translated-sentence selection processing in step S403 are performed. A detailed method for the selection is described later with reference to FIGS. 6 and 7.

After the backward-translated-sentence selection processing in step S406 is executed, if it is determined that it is necessary to increase the number of backward-translated sentences (YES in S407), the flow returns to step S402, and the forward translation processing is performed again. After the forward translation processing is executed again, if the forward-translated-sentence selection processing is executed in step S403, forward-translated sentences may be selected based on a criterion different from the previous criterion or may be selected based on the same criterion as the previous criterion.

After the backward translation processing in step S406 is performed, if it is determined that it is not necessary to increase the number of backward-translated sentences (NO in S407), the M backward-translated sentences selected from the backward-translated sentence group are output on the information display terminal 100 as user presentation sentences in the next step.

In step S408, the M backward-translated sentences are transmitted to the information display terminal 100 and are displayed on the touch panel display.

In step S409, the selected-sentence detector 105 detects whether or not one backward-translated sentence has been selected from the M backward-translated sentences displayed on the touch panel display of the information display terminal 100.

If it is determined that no backward-translated sentence has been selected for a certain period of time (NO in S409), the machine translation system returns to its initial state and receives an input sentence from the user. At this point in time, the display screen on the touch panel display is reset.

Also, when the user executes some kind of reset operation, the machine translation system similarly returns to its initial state (step S410) and receives an input from the user.

If the selected-sentence detector 105 detects that one of the backward-translated sentences has been selected (YES in S409), user selection information indicating which of the backward-translated sentences was selected is transmitted to the translation server 300.

In step S411, the selected-sentence determiner 235 obtains the M backward-translated sentences from the backward-translated-sentence selector 234, and determines which of the backward-translated sentences was selected from the M backward-translated sentences at the information display terminal 100, on the basis of the user selection information received from the information display terminal 100. In the following steps described below, the backward-translated sentence selected from the M backward-translated sentences is referred to as a "selected backward-translated sentence", and each backward-translated sentence not selected from the M backward-translated sentences is referred to as an "unselected backward-translated sentence". The selected-sentence determiner 235 outputs the selected backward-translated sentence and the unselected backward-translated sentences to the phrase divider 236.

In step S412, phrase division processing is performed on the selected backward-translated sentence, the unselected backward-translated sentences, and the forward-translated sentences corresponding to the respective selected backward-translated sentence and unselected backward-translated sentences.

The phrase division is to divide a sentence into phrases or words, which are shorter units. A specific example of the phrase division processing is described later.

FIG. 11 illustrates an example of a typical phrase table in the present embodiment. The "phrase table" as used herein refers to a table showing correspondences in units of phrases or words between the source language and the target language.

When the source language is Japanese and the target language is English, the phrase table in FIG. 11 shows, from the left side, a Japanese phrase, an English phrase, an English-to-Japanese translation probability of the phrase (the probability that the English phrase is translated into the Japanese phrase), the product of probabilities of words translated from English to Japanese (the product of translation probabilities of words in the phrase when English is translated into Japanese), a Japanese-to-English translation probability of the phrase (the probability that the Japanese phrase is translated into the English phrase), and the product of probabilities of words translated from Japanese to English (the product of translation probabilities of words in the phrase when Japanese is translated into English). The phrase table, however, does not necessary have to include all of the pieces of information, and the way they are shown is not limited thereto. Since the phrase table includes the translation probabilities, it is also called a probability model in a broad sense.

For example, the phrase table illustrated in FIG. 11 shows that the probability that phrase PH2 is translated into phrase PH1 is 0.38, the product of the probability that word SD3 is translated into word SD1 and the probability that word SD4 is translated into word SD2 is 0.04, the probability that the phrase PH1 is translated into phrase PH2 is 0.05, and the product of the probability that word SD1 is translated into word SD3 and the probability that word SD2 is translated into word SD4 is 0.02.

Through use of such a phrase table, phrase division processing is performed on the selected backward-translated sentence, the unselected backward-translated sentences, and the forward-translated sentences corresponding to these backward-translated sentences.

Figure 12:
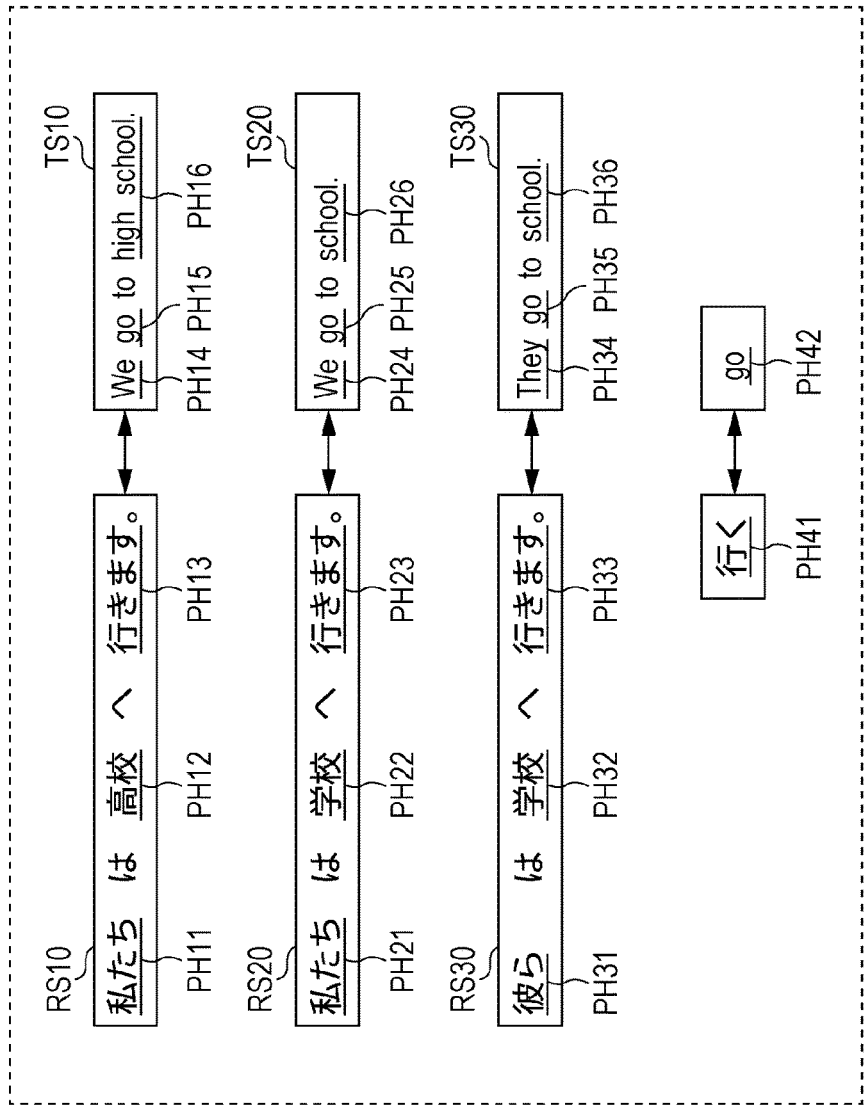
FIG. 12 illustrates an overview of phrase division in the present embodiment.

FIG. 12 illustrates an overview of the phrase division.

FIG. 12 illustrates backward-translated sentences RS10, RS20, and RS30 expressed in the source language and forward-translated sentences TS10, TS20, and TS30 in the target language which correspond to the respective backward-translated sentences RS10, RS20, and RS30. For example, when the phrase division processing is executed on the backward-translated sentence RS10 in the source language, for example, the backward-translated sentence RS10 is divided into three phrases, that is, phrases PH11, PH12, and PH12. Also, for example, when the phrase division processing is executed on the forward-translated sentence TS10 in the target language, the forward-translated sentence TS10 is divided into three phrases (words), that is, phrases PH14, PH15, and PH16.

Into what phrases the target sentence on which the phrase division processing is executed is divided depends on a character string in the source language and a character string in the target language, the character strings being shown in the phrase table, and is thus not uniquely determined in some cases.

Step S413 is phrase evaluation processing for evaluating a score for each phrase output in the phrase division processing, in accordance with a predetermined criterion. Details of the phrase evaluation processing is described later.

In step S414, the forward-translated sentence corresponding to the selected backward-translated sentence determined in S411 is transmitted to the information display terminal 100 and is displayed on the touch panel display as a translation result. In this case, the selected backward-translated sentence displayed on the touch panel display may be displayed in a highlighted manner. The display of the unselected backward-translated sentences on the touch panel display may be cleared, and any display may be performed as long as it is possible to clearly show that the displayed translation result is the forward-translated sentence corresponding to the backward-translated sentence selected by the user.

Since the process in step S414 and the series of processes in steps S412 to S414 can be performed in parallel, step S414 may be executed at any timing between the time before the phrase division processing in step S412 and the time after the learning processing in step S415.

In step S415, machine learning, such as reinforcement learning, discriminative learning, or neural network learning, is performed based on the scores for the respective phrases obtained in step S413. Details of this processing is described later with reference to FIGS. 8 and 9.

Figure 6:
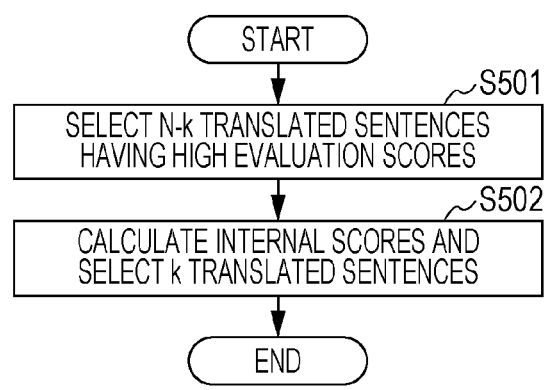
FIG. 6 is a flowchart illustrating a specific operation of translated-sentence selection processing in the present embodiment.

FIG. 6 is a flowchart illustrating a specific operation of the translated-sentence selection processing in the present embodiment.

Specific processes in the forward-translated-sentence selection processing executed by the forward-translated-sentence selector 232 in step S403 and the backward-translated-sentence selection processing executed by the backward-translated-sentence selector 234 in step S406 will be described below with reference to FIG. 6. For convenience of description, the two types of processing, that is, the forward-translated-sentence selection processing and the backward-translated-sentence selection processing, are collectively referred to as "translated-sentence selection processing" hereinafter.

The forward-translated-sentence selector 232 executes the forward-translated-sentence selection processing for selecting N forward-translated sentences from the forward-translated sentence group generated by the forward translator 231, and the backward-translated-sentence selector 234 executes the backward-translated-sentence selection processing for selecting M backward-translated sentences from the backward-translated sentence group generated by the backward translator 233. The N forward-translated sentences are selected based on the respective evaluation scores of the forward-translated sentences included in the forward-translated sentence group, and the M backward-translated sentences are selected based on the respective evaluation scores of the backward-translated sentences included in the backward-translated sentence group.

Since the following description can be applied to both the forward-translated-sentence selection processing and the backward-translated-sentence selection processing, they are referred to as "translated-sentence selection processing" in the following description, and a forward-translated sentence and a backward-translated sentence are collectively referred to as "translated sentences". Also, a forward-translated sentence group and a backward-translated sentence group are each referred to as a "translated sentence group". In addition, although, in practice, the number of forward-translated sentences that are selected is N, and the number of backward-translated sentences that are selected is M, the description below will be given assuming that the number of forward-translated sentences and the number of backward-translated sentences are each N.

In step S501, N-k translated sentences having high evaluation scores are selected from a translated sentence group (where 1<=N and 0<=k<=N). BLEU, which is often used as a scheme for evaluating translation accuracies, may be used for the evaluation scores. Other examples of the scheme for evaluating the translation accuracies include Word Error Rate (WER), Metric for Evaluation of Translation with Explicit ORdering (METEOR), and RIBES, and the scheme to be employed may be any of these schemes or may be another scheme.

The remaining k translated sentences that were not selected from the translated sentences in the translated sentence group in step S501 are selected (S502).

The k translated sentences may be selected by extracting translated sentences whose evaluation scores are within a predetermined threshold and randomly selecting the k translated sentences from the extracted translated sentences. The k translated sentences may also be selected by extracting translated sentences whose evaluation scores are within a predetermined threshold and sequentially selecting the k translated sentences from the extracted translated sentences in ascending order of the evaluation scores. Although, in the above description, translated sentences having high evaluation scores are selected to select the N-k translated sentences, translated sentences having high evaluation scores do not necessarily have to be selected to select the k translated sentences. When only translated sentences having high evaluation scores mechanically given based on a specific evaluation criterion are selected, there is a high possibility that all of the contents of the selected translated sentences are similar to each other. When consideration is given to a case in which the information display terminal 100 presents a plurality of backward-translated sentences to the user and the user selects one of the backward-translated sentences, it is desirable that the information display terminal 100 present backward-translated sentences selected from points of view that are different from each other to some degree.

When only similar backward-translated sentences are presented and the user selects one of the backward-translated sentences, there is a risk of being unable to obtain a high learning effect in machine learning processing (described below) performed on the machine translation system. When machine learning processing is executed using, as teacher data, a backward-translated sentence selected by the user and backward-translated sentences not selected by the user, the selected backward-translated sentence that the machine translation system is made to learn as a positive example (a correct translation) and the unselected backward-translated sentences that the machine translation system is made to learn as negative examples (incorrect translations) become sentences that are similar to each other. Consequently, a prominent difference between the positive example and the negative examples cannot be shown to the machine translation system, thus a learning effect cannot be expected. Accordingly, it is desirable to select backward-translated sentences from points of view that are different from each other to some degree, as described in the present embodiment.

When backward-translated sentences that are similar to each other are presented, the user has to select one of the backward-translated sentences, considering small differences among the backward-translated sentences. Thus, there are concerns that the user cannot intuitively select one of the backward-translated sentences, and it takes time to select the backward-translated sentence. When backward-translated sentences selected from points of view that are different from each other to some degree are presented, as in the present embodiment, the user can intuitively select a translation that he or she intends.

Since the backward-translated sentences are generated from the forward-translated sentences, it is desirable that the forward-translated sentences be also pre-selected based on ideas that are different from each other to some degree.

Another scheme for selecting the k translated sentences is to select k translated sentences on the basis of past user selection information. For example, the number of times each translated sentence was selected by the user in the past or the like is stored (in the case of each backward-translated sentence, the number of times the backward-translated sentence was directly selected is stored, and in the case of each forward-translated sentence, the number of times the corresponding backward-translated sentence was selected is stored), and the k translated sentences may be sequentially selected from the translated sentence group in descending order of the stored numbers of times. Rather than selecting the k translated sentences on the basis of such directly obtained numbers of times, the k translated sentences may also be selected based on an analyzed tendency obtained by analyzing a tendency of translated sentences that are easy for the user to select with respect to translation-source sentences on the basis of the user's history of using the machine translation system. The scheme for selecting the k translated sentences is not limited to the above-described schemes, as long as it uses a selection criterion different from the selection criterion for selecting the N-k translated sentences.

In addition, in the method for selecting the k translated sentences, processing for excluding a translated sentence having substantially the same meaning as any of those of the N-k translated sentences may be performed. Also, processing for excluding any of translated sentences having substantially the same meaning among the k translated sentences may be performed. Alternatively, when a translated sentence having a meaning different from any of those of the N-k translated sentences is not included in the k translated sentences or when the number of translated sentences having a meaning different from those of the N-k translated sentences is small in the k translated sentences, processing for adding a translated sentence having a different meaning may be performed. Also, in the backward-translated-sentence selection processing, for example, processing for selecting a backward-translated sentences having substantially the same meaning may be performed through comparison with the translation-source sentence.

For example, the number of translated sentences in each of the interrogative form, affirmative form, negative form, and imperative form (the number of different sentence forms), the translated sentences being included in the translated sentence group, is counted, and when the number of translated sentences is smaller than or equal to a threshold, the forward translation processing or the backward translation processing is performed again.

For example, there is also a scheme for performing syntax analysis on translated sentences. Syntax analysis is performed on the translated sentences included in the translated sentence group to determine what are words indicated by the subjects of the respective translated sentences, and when the number of different subjects, the number indicating how many types of word indicating the subjects is included, is smaller than or equal to a threshold, the forward translation processing or the backward translation processing is performed again. In this case, the number of different predicates, not the number of different subjects, may be calculated. Alternatively, both the number of different subjects and the number of different predicates may be calculated.

In this case, by using the number of different sentence forms, the number of different subjects, the number of different verbs, the number of different objects, or the like as an evaluation score, the forward-translated-sentence selection processing and/or the backward-translated-sentence selection processing may be performed so that a predetermined number of different sentence forms, different subjects, different verbs, or different objects are included.

When the forward-translated-sentence selection processing is executed, for example, based on an evaluation criterion that the number of different sentence forms be two or more, forward-translated sentences can be selected using the number of different sentence forms as an evaluation score. Analysis involving syntax analysis and/or meaning analysis may be sequentially performed on the individual forward-translated sentences in the forward-translated sentence group to represent, as scores indicating the number of different sentence forms, how many interrogative forms, affirmative forms, negative forms, and imperative forms have appeared, and one small collection including two or more of the forms may be created.

For example, when the backward-translated-sentence selection processing is executed based on an evaluation criterion that the number of different subjects be smaller than or equal to a predetermined number, backward-translated sentences can be selected using the numbers of different subjects as evaluation scores.

The forward-translated-sentence selection processing or the backward-translated-sentence selection processing is not limited to the examples described above, and may be implemented by any forward-translated-sentence selection scheme or any backward-translated-sentence selection scheme.

In the backward-translated-sentence selection processing, values obtained by performing evaluation through comparison with a translation-source sentence may be used as evaluation scores. For example, syntax analysis may be performed on a translation-source sentence and a plurality of backward-translated sentences in the backward-translated sentence group to determine the similarity between the translation-source sentence and each of the backward-translated sentences, and k backward-translated sentences may be selected on the basis of the determined similarities.

The present disclosure is not limited to these examples, and arbitrary evaluation scores may be combined together. In addition, the scores may be used in combination so that the number of different sentence forms, different subjects, different verbs, or different objects included in N translated sentences, N being pre-set as a predetermined number, reaches a desired number.

The above-described method for selecting the translated sentences is one example, and the present disclosure is not limited thereto.

For k=0, all of the N translated sentences are sequentially selected in descending order of the evaluation scores thereof. For k=N, the translated sentences are selected using a method other than the method for sequentially selecting all of the N translated sentences in descending order of the evaluation scores thereof.

The "criterion in the system" is that, for example, the backward translation processing is not performed on a forward-translated sentence for which a score is low (i.e., the number of backward-translated sentences generated for one forward-translated sentence is 0), the score being calculated using BLEU-based evaluation, manual evaluation, or the like, and an arbitrary number of backward-translated sentences is obtained for a forward-translated sentence for which the score is high (i.e., a plurality of backward-translated sentences are generated for one forward-translated sentence). When the user determines the number of f backward-translated sentences, for example, he or she may set how many backward-translated sentences are to be generated for one forward-translated sentence, but the present disclosure is not limited thereto.

Figure 7:
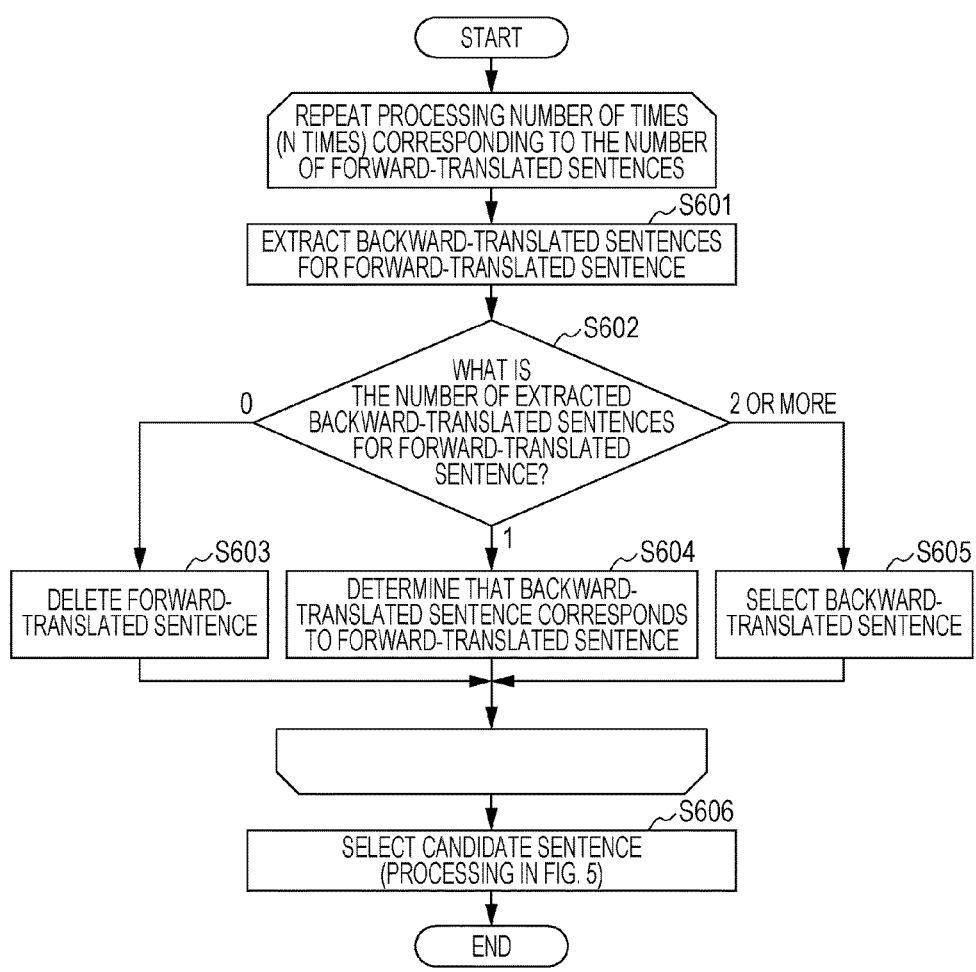
FIG. 7 is a flowchart illustrating a specific operation of backward-translated-sentence selection processing in the present embodiment.

FIG. 7 is a flowchart illustrating a specific operation of the backward-translated-sentence selection processing in the present embodiment.

As described above in the backward translation processing (step S405) with reference to FIG. 5, a forward-translated sentence for which a backward-translated sentence is not generated may exist, and a plurality of backward-translated sentences may be generated based on one forward-translated sentence. Now, a description will be given of processing for selecting one backward-translated sentence from a plurality of backward-translated sentences obtained based on one forward-translated sentence.

The following processing is performed on each of the N forward-translated sentences selected in the forward-translated-sentence selection processing.

In step S601, backward-translated sentences generated for a forward-translated sentence A of the N forward-translated sentences are extracted.

In step S602, the number of extracted backward-translated sentences is determined. If no backward-translated sentence is generated for the forward-translated sentence A, that is, if the number of backward-translated sentences generated for the forward-translated sentence A is zero ("0" in step S602), the forward-translated sentence A will not be presented to the user and is thus deleted (step S603).

Next, if the number of backward-translated sentences for the forward-translated sentence A is one ("1" in step S602), it is determined that this backward-translated sentence is a backward-translated sentence corresponding to the forward-translated sentence A (step S604).

Lastly, if two or more backward-translated sentences are generated for the forward-translated sentence A ("2 or more" in step S602), an optimum one of the backward-translated sentences is determined as a backward-translated sentence corresponding to the forward-translated sentence A (step S605). The optimum backward-translated sentence is determined using a method that refers to automatic evaluation scores or scores resulting from manual evaluation. The above-described processes are repeated on each of the N forward-translated sentences.

Lastly, processing, such as excluding a backward-translated sentence having the substantially same meaning from the backward-translated sentences obtained in the above-described processes or adding a translated sentence having a different meaning when the number of backward-translated sentences having different meanings is small, may be performed, as needed (step S606). The processing in this case is substantially the same as the processing described above with reference to FIG. 5.

In the above description, in step S605 in FIG. 7, one backward-translated sentence is selected for one forward-translated sentence. However, a plurality of backward-translated sentences may be selected for one forward-translated sentence. In such a case, the plurality of backward-translated sentences to be presented to the user include backward-translated sentences to which the same forward-translated sentence corresponds.

Figure 8:
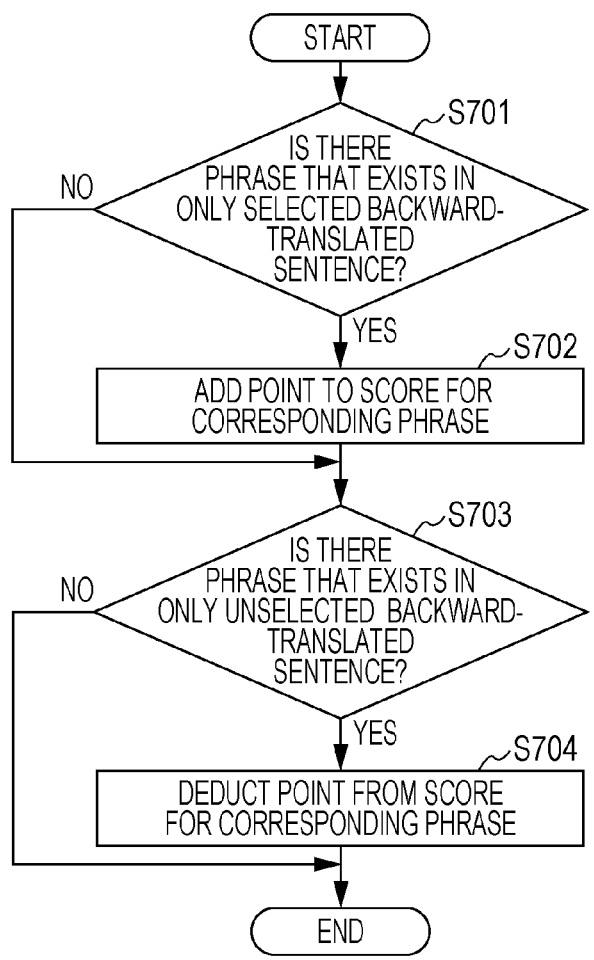
FIG. 8 is a flowchart illustrating a specific operation of phrase evaluation processing in the present embodiment.

FIG. 8 is a flowchart illustrating a specific operation of the phrase evaluation processing in the present embodiment.

It is assumed that, in the initial state of this flow, the selected backward-translated sentence, the unselected backward-translated sentences, and the forward-translated sentences corresponding to the selected backward-translated sentence and the unselected backward-translated sentences have been divided into phrases and been obtained. It is also assumed that a phrase table for the phrases obtained by dividing the phrases of those backward-translated sentence and forward-translated sentences has been obtained. Although this phrase evaluation processing is performed on each of the backward-translated sentences and the forward-translated sentences, the phrase division processing on the backward-translated sentences will be described by way of example, for convenience of description.

In step S701, phrases included in the selected backward-translated sentence are each compared with phrases included in the unselected backward-translated sentences to check whether or not there is a phrase that exists in only the selected backward-translated sentence.

If there is a phrase that exists in only the selected backward-translated sentence (YES in step S701), a point is added to a user selection score for the phrase that exists in only the selected backward-translated sentence (step S702). This user selection score is a score with which a phrase appearing in only a selected sentence is regarded as being good and, in processing described below and illustrated in FIG. 9, the user selection score is eventually reflected in the Japanese-to-English translation probability or English-to- Japanese translation probability in the phrase table in conjunction with a corresponding phrase in the forward-translated sentence (or the translation-source sentence, when the phrase evaluation processing is performed on the forward-translated sentence). The addition of the point to the score in this case may be performed using any addition method. For example, possible methods include adding the same point to corresponding phrases, adding a point depending on the length of a corresponding phrase, and so on. When the addition of the point to the score is completed, the flow proceeds to step S703. If there is no phrase that exists in only the selected backward-translated sentence (NO in step S701), the flow proceeds to step S703 directly without performing particular processing.

Similarly, in step S703, the phrases included in the unselected backward-translated sentence are each compared with the phrases included in the selected backward-translated sentence to check whether or not there is a phrase that exists in only the unselected backward-translated sentences phrase(s).

If there is a phrase that exists in only the unselected backward-translated sentence(s) (YES in step S703), a point is deducted from the user selection score for the phrase that exists in only the unselected backward-translated sentence(s) (step S704). The deduction of the point from the score in this case may be performed using any deduction method. For example, possible methods include deducting the same point from corresponding phrases, deducting a point depending on the length of a corresponding phrase, and so on.

In steps S702 and S704, the addition of the point to the user selection score and the deduction of the point therefrom are not necessarily essential. That is, in the flowchart in FIG. 8, without performing both the addition of the point to the user selection score and the deduction of the point from the user selection score for a phrase that exists in only the selected backward-translated sentence, the deduction of the point from the user selection score may be performed on a phrase that exists in only the unselected backward-translated sentence(s). Alternatively, the point may be added to the user selection score for a phrase that exists in only the selected backward-translated sentence, without performing both the addition of the point to the user selection score and the deduction of the point from the user selection score for a phrase that exists in only the unselected backward-translated sentence(s).

Also, the addition of the point to the user selection score may be performed for a phrase that exists in the selected backward-translated sentence and some of the unselected backward-translated sentences. In this case, one conceivable scheme is, for example, to add a value considering the user selection score for a phrase included in only the selected backward-translated sentence and the user selection score(s) for a phrase included in only the unselected backward-translated sentence(s) (e.g., the average value of the user selection score for a phrase included in only the selected backward-translated sentence and the user selection score for a phrase included in only the unselected backward-translated sentence(s)). The above-described methods for adding the point to the score are exemplary, and the present disclosure is not limited thereto.

Now, a description will be given in conjunction with a specific example with reference to FIG. 12. For example, a description will be given of a case in which three backward-translated sentences are presented on the information display terminal 100 and the user selects one of the backward-translated sentences. In this case, the three backward-translated sentences presented on the information display terminal 100 are assumed to be backward-translated sentences RS10, RS20, and RS30, and the backward-translated sentence selected by the user is assumed to be the backward-translated sentence RS10. For convenience of description, a backward-translated sentence selected by the user is defined as a "selected backward-translated sentence", and backward-translated sentences not selected by the user are defined as "unselected backward-translated sentences". In the initial state of the flow, the backward-translated sentence RS10, which is a selected backward-translated sentence, has been divided into phrases PH11, PH12, and PH13. In the case of the unselected backward-translated sentences, similarly, the backward-translated sentence RS20 has been divided into phrases PH21, PH22, and PH23, and the backward-translated sentence RS30 has been divided into phrases PH31, PH32, and PH33.

In S701, it is checked whether or not there is a phrase that exists in only the backward-translated sentence RS10, which is a selected backward-translated sentence, among the backward-translated sentences RS10, RS20, and RS30. Since the phrase PH12 exists in only the backward-translated sentence RS10, which is a selected backward-translated sentence, a point is added to the user selection score for the phrase PH12, so that the user selection score becomes "+1".

Similarly, in S702, it is checked whether or not there is a phrase that exists in only the backward-translated sentences RS20 and RS30, which are unselected backward-translated sentences. Since the phrase PH22 (PH32) and the phrase PH31 are included in only the unselected backward-translated sentences, a point is deducted from each of the user selection scores for the phrase PH22 (PH32) and the phrase PH31, so that the user selection scores become "−1".

In this case, neither the addition of a point to the user selection score nor the deduction of a point therefrom is performed for the phrases PH11 (PH21) and PH13 (PH23, PH33) included in both the selected backward-translated sentence and the unselected backward-translated sentences.

As a result of the above-described processing, the final points added to the user selection scores and the final points deducted therefrom for the corresponding phrases are as follows:

"±0" for the phrase PH11 (PH21),
"−1" for the phrase PH31,
"−1" for the phrase PH22 (PH32),
"+1" for the phrase PH12, and
"±0" for phrase PH13 (PH23, PH33).

Since the points added to and deducted from the user selection scores are merely exemplary, and the point may be added or deducted on an order greater or smaller than the points described above.

The phrase evaluation processing on a forward-translated sentence, which is a target language, will be described below in conjunction with a specific example with reference to FIG. 12. Forward-translated sentences TS10, TS20, and TS30 correspond to the above-described backward-translated sentences RS10, RS20, and RS30, respectively. In the initial state of the flow, the forward-translated sentence TS10 has been divided into phrases PH14, PH15, and PH16. The forward-translated sentence TS20 has been divided into phrases PH24, PH25, and PH26, and the forward-translated sentence TS30 has been divided into phrases PH34, PH35, and PH36.

In S701, it is checked whether or not there is a phrase that exists in only a forward-translated sentence 1 corresponding to a selected backward-translated sentence 1. Since the phrase PH16 is included in only the forward-translated sentence TS10, a point is added to the user selection score for the phrase PH16, so that the user selection score becomes "+1".

Similarly, in S702, it is checked whether or not there is a phrase that exists in only either of the forward-translated sentences TS20 and TS30 corresponding to the backward-translated sentences RS20 and RS30, which are unselected backward-translated sentences. Since the phrases PH26 (PH36) and PH34 are included in only one of the forward-translated sentences TS20 and TS30, a point is deducted from each of the user selection scores for the phrases PH26 (PH36) and PH34, so that the user selection scores become "−1".

Neither the addition of the point to the user selection score nor the deduction of the point therefrom is performed for the phrases PH24 and PH15 (PH25, PH35) included in both the forward-translated sentence TS10 corresponding to the selected backward-translated sentence and the forward-translated sentences TS20 and TS30 corresponding to the unselected backward-translated sentences.

As a result of the above-described processing, the final points added to the user selection scores and the final points deducted therefrom for the corresponding phrases are as follows:

"±0" for the phrase PH14 (PH24),
"−1" for the phrase PH34,
"−1" for the phrase PH26 (PH36),
"+1" for the phrase PH16, and
"±0" for the phrase PH15 (PH25, PH35).

Since the points added to and deducted from the user selection scores are merely exemplary, and the point may be added or deducted on an order greater or smaller than the points described above.

Figure 9:
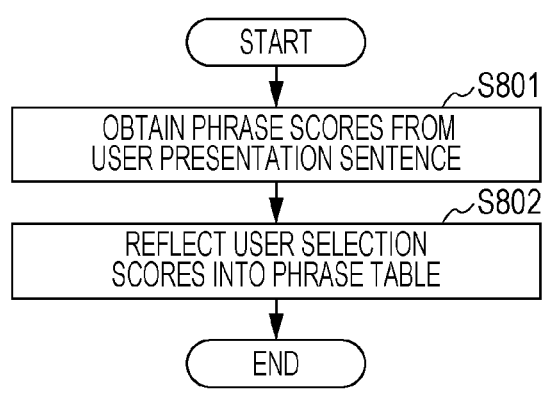
FIG. 9 is a flowchart illustrating a specific operation of learning processing in the present embodiment.

FIG. 9 is a flowchart illustrating a specific operation of the learning processing in the present embodiment.

In step S801, phrase pairs each including a phrase included in a forward-translated sentence corresponding to a selected backward-translated sentence and a phrase included in the selected backward-translated sentence or phrase pairs each including a phrase included in a translation-source sentence corresponding to a selected backward-translated sentence and a phrase included in a forward-translated sentence corresponding to the selected backward-translated sentence are obtained. Each "phrase pair" refers to two phrases having a correspondence (having the same meaning) between the source language and the target language during machine translation). In addition, at the same time, the user selection scores obtained in the processing in FIG. 8 are also obtained.

With respect to the phrase pairs, when the user selection scores corresponding to the values in the phrase table which are referred to when translation is performed from the source language to the target language are defined using the example illustrated in FIG. 12, for example, the following are given:

phrase PH31→phrase PH34: −1
phrase PH22 (PH32)→phrase PH26 (PH35): −1
phrase PH11 (PH21)→phrase PH14 (PH24): 0
phrase PH13 (PH23, PH33)→phrase PH15 (PH25, PH35): 0
phrase PH12→phrase PH16: +1

With respect to the phrase pairs, when the user selection scores corresponding to the values in the phrase table which are referred to when translation is performed from the target language to the source language are defined, for example, the following are given:

phrase PH34→phrase PH31: −1
phrase PH26 (PH36)→phrase PH22 (PH32): −1
phrase PH14 (PH24)→phrase PH11 (PH21): 0
phrase PH15 (PH25, PH35)→phrase PH13 (PH23, PH33): 0
phrase PH16→phrase PH12: +1

In step S802, the above-described user selection scores are reflected into the English-to-Japanese translation probabilities or the Japanese-to-English translation probabilities in the phrase table stored in the storage unit 240. The user selection scores reflected in the phrase table may be multiplied by a certain value or may be given a gradient or weighting.

By using these schemes, the machine translator 230 and the backward translator 233 perform machine learning, such as reinforcement learning, discriminative learning, and neural network learning.

In the machine translation in the related art, a bilingual corpus (data obtained by gathering pairs of sentences that are mutual translations between two different languages) is tuned based on probability values in a phrase table like that illustrated in FIG. 11. However, a scheme for performing machine learning by giving a difference between a score for a phrase included in the user selected sentence and a score for a phrase not included in the user selected sentence has not been available up to now, and the machine translation system in the present disclosure can more reflect an evaluation result of the user.

In addition, through the machine learning, it is possible to learn a translation model, a language model, or the like created from a prepared bilingual corpus while sequentially mixing, for each phrase, the selection result of the user into the translation model or language model. Thus, it is possible to improve the accuracy.

In addition, when the machine learning is performed, an optimum parameter is selected based on the data. Thus, since the results of selection performed by humans (users) are reflected in the translation system, it is possible to construct a translation system that is easy for humans to use.

Not only can such machine learning be performed, but also a new corpus can be generated based on obtained phrases and can also be utilized as a bilingual corpus for translation engine learning.

Figure 10:
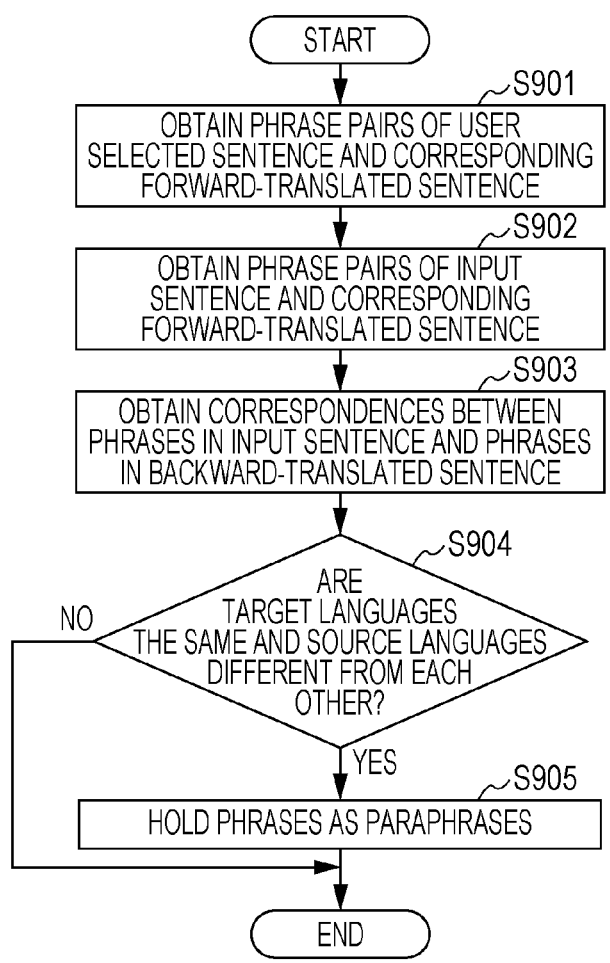
FIG. 10 is a flowchart illustrating specific processing of a learner in the present embodiment.

FIG. 10 is a flowchart illustrating specific processing of the learner 238 in the present embodiment. Details of the flowchart illustrated in FIG. 10 will be described in conjunction with the backward-translated sentences and the forward-translated sentences illustrated in FIG. 12.

In step S901, phrase pairs of a user selected sentence and the corresponding forward-translated sentence are obtained.

A description will be given of an example of a case in which the backward-translated sentence RS10 is selected by the user when the backward-translated sentences RS10, RS20, and RS30 are displayed in a user-presentation-sentence display area 1102 (i.e., a case in which the backward-translated sentence RS10 is a user selected sentence). Since the backward-translated sentence RS10 is selected by the user, phrase pairs, specifically, a pair of the phrases PH11 and PH14, a pair of the phrases PH12 and PH16, and a pair of the phrases PH13 and PH15, are obtained.

In step S902, phrase pairs of an input sentence and the corresponding forward-translated sentence, which were used for machine translation performed by the machine translator 230, are obtained.

For example, when the content of the backward-translated sentence RS30 is the same as the content of the input sentence, phrase pairs, specifically, a pair of the phrases PH31 and PH34, a pair of the phrases PH32 and PH36, and a pair of the phrases PH33 and PH35, are obtained.

In step S903, phrases having the same character string in the target language between the phrases in the input sentence and the phrases obtained from the user selected sentence are obtained. For example, the phrase pairs of the user selected sentence are assumed to include a pair of the phrases PH11 and PH14, a pair of the phrases PH12 and PH16, and a pair of the phrases PH13 and PH15. On the other hand, the phrase pairs of the input sentence are assumed to include a pair of the phrases PH31 and PH34, a pair of the phrases PH32 and PH36, and a pair of the phrases PH41 and PH42.

In this case, in the phrases in the user selected sentence and the phrases in the input sentence, the phrase PH33 in the source language and the phrase PH41 are phrases that have the same meaning but are expressed differently. The phrases PH33 and PH41 correspond to each other between the phrases in the user selected sentence and the phrases in the input sentence.

Lastly, in step S904, it is checked whether or not the target languages of the phrases are the same and the source languages thereof are different from each other. If the target languages of the phrases are the same and the source languages thereof are different from each other (YES in S904), the phrases are held as paraphrases (restatements) (S905). That is, since the target languages of the phrases are the same and the source languages thereof are different from each other, these phrases can be regarded as restatements in the source language.

For example, the phrases PH33 and PH41 can be regarded as restatements and are held as paraphrases in the source language.

The machine translator 230 can refer to the paraphrases during machine translation or can refer to the paraphrases as restatements in the source language before performing translation.

Figure 13:
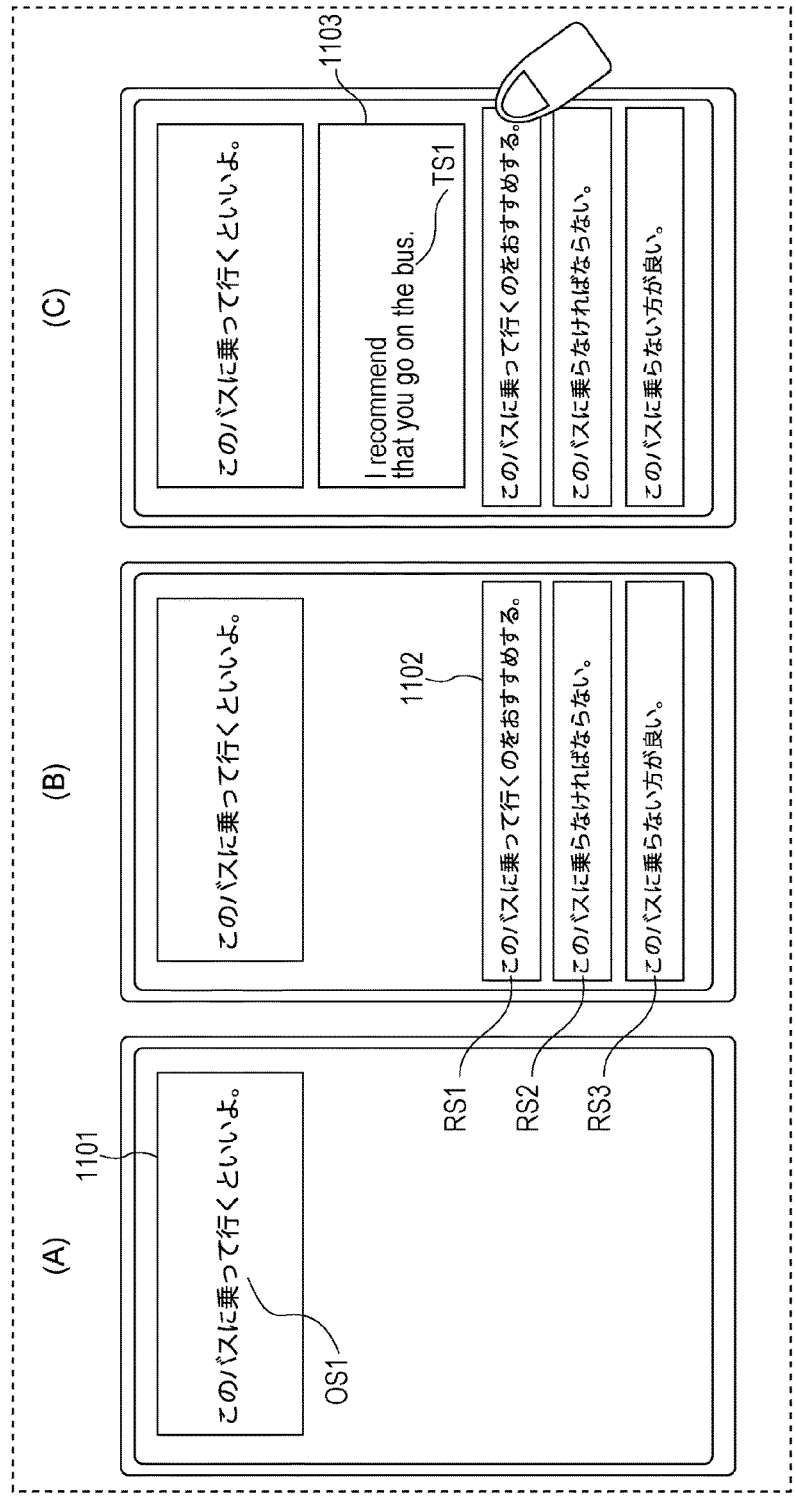
FIG. 13 illustrates an example of a display screen in the present embodiment.

FIG. 13 illustrates an example of a display screen in the present embodiment.

For example, when an input original sentence OS, which is a sentence to be translated, is received from the user, the content of the input original sentence OS1 is displayed on an input-sentence display area 1101, as illustrated in FIG. 13(A).

Next, as illustrated in FIG. 13(B), a backward translation result of a translated sentence obtained by translating the original sentence OS1 is displayed in the user-presentation-sentence display area 1102.

In this case, a mode in which three backward-translated sentences are output will be described by way of example. For example, backward-translated sentences RS1, RS2, and RS3 are output as a backward translation result and are displayed in the user-presentation-sentence display area 1102. The backward-translated sentences RS1 to RS3 displayed in the user-presentation-sentence display area 1102 illustrated in FIG. 13(B) are similar sentences having similar meanings in the source language. Although it is expected that these backward-translated sentences RS1 to RS3 are similar sentences having similar meanings because of characteristics of the backward translation processing, the system may also be implemented so that sentences having meanings that are different from each other are output.

Next, the user checks the backward translation result displayed in the user-presentation-sentence display area 1102 and selects a backward-translated sentence that is the closest to the input content he or she intended, as illustrated in FIG. 13(C). In this case, for example, the backward-translated sentence RS1 is selected for the original sentence OS1.

When the user selects a backward-translated sentence, a translated sentence corresponding to the selected backward-translated sentence is displayed in a translation-result display area 1103. In this example, a translated sentence TS1, which is a translated sentence for the backward-translated sentence RS1, is displayed.

The screen display is not limited to layouts as illustrated in FIGS. 13(A), 13(B), and 13(C). Various buttons may be arranged as appropriate. For example, when a button is operated after an original sentence to be translated is input, the translation processing may be executed. Also, when a button is operated, backward-translated sentences may be displayed in the user-presentation-sentence display area 1102. The arrangements of, the content displayed in, and the directions of the input-sentence display area 1101, the user-presentation-sentence display area 1102, and the translation-result display area 1103 are not limited to those described above.

Figure 14:
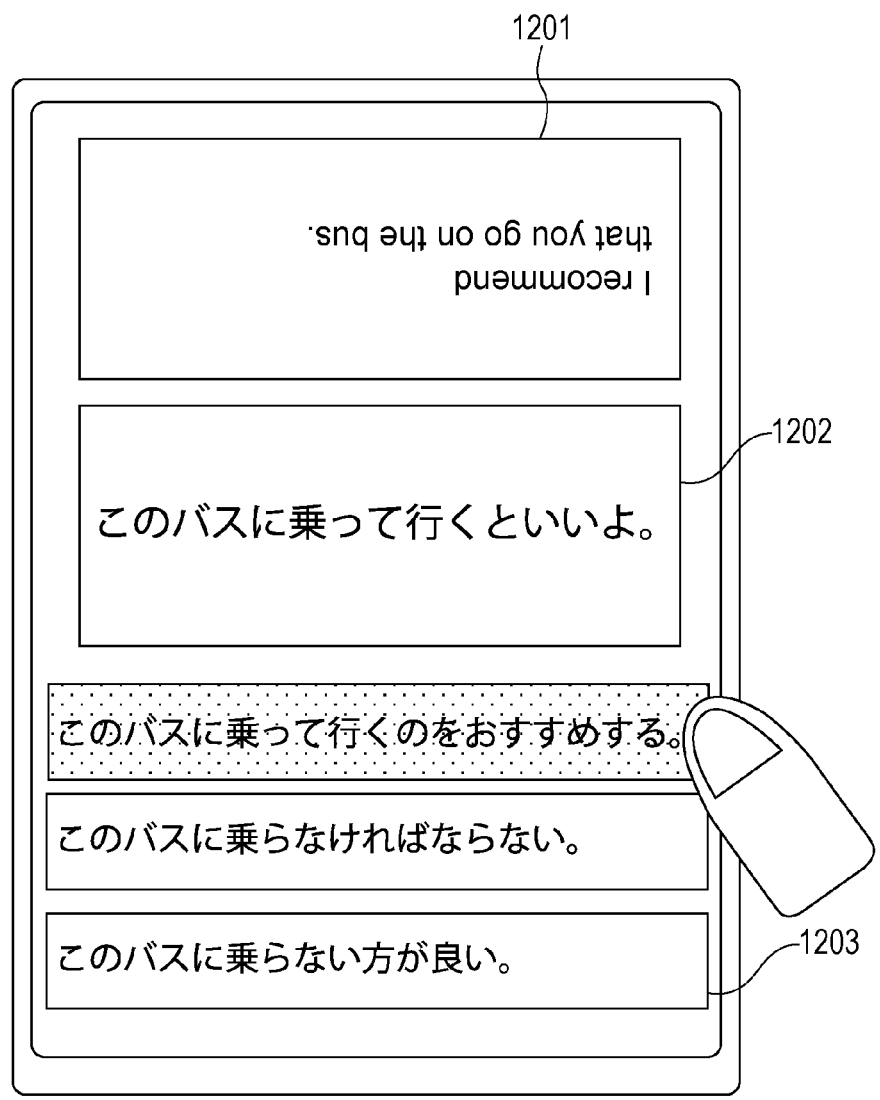
FIG. 14 illustrates one example of a display screen in the present embodiment.

FIG. 14 illustrates one example of a display screen in the present embodiment.

What is displayed is partially different from that illustrated in FIG. 13(C). In this case, the direction of a sentence displayed in a translation-result display area 1201 and the direction of sentences displayed in an input-sentence display area 1202 and a user-presentation-sentence display area 1203 differ from each other. This is envisaged for a scene in which two users (a source language speaker and a target language speaker) are making a communication face to face over an information display terminal. That is, the sentences in the input-sentence display area 1202 and the user-presentation-sentence display area 1203 are displayed in a direction that suits the source language speaker, and the sentence in the translation-result display area 1201 is displayed in a direction that suits the target language speaker. With this arrangement, the source language speaker does not have to read out, to the target language speaker, a translated sentence output with respect to an input sentence and does not have to change the direction of the information display terminal so that the target language speaker can easily check the translated sentence. This allows users who speak different languages to communicate with each other smoothly over an information display terminal or the like. The direction of the translation-result display area 1201 can be changed by an arbitrary operation performed by the user. Similarly to the screen illustrated in FIG. 13, the arrangements of, the content displayed in, and the directions of the translation-result display area 1201, the input-sentence display area 1202, and the user-presentation-sentence display area 1203 are not limited to those described above.

Although the translation method according to one aspect of the present disclosure has been described above in conjunction with the particular embodiments, the present disclosure is not limited to the embodiments. A mode obtained by making various modifications conceived by those skilled in the art to the embodiments or a mode constituted by combining the constituent elements in a different embodiment may also be encompassed by the scope of the present disclosure, as long as such modes do not depart from the spirit and scope of the present disclosure.

For example, although, in the above description, the user selects one backward-translated sentence from the plurality of backward-translated sentences presented on the information display terminal 100, he or she may select two or more backward-translated sentences. For example, the arrangement may also be such that one backward-translated sentence is selected by the user, a forward-translated sentence corresponding to the selected backward-translated sentence is presented, other user unselected sentences are evaluated, and the result of the evaluation is reflected in the system as a learning result. Examples of a method for the evaluation in this case include a method in which the user ranks unselected sentences in decreasing or ascending order of translation qualities, a method in which the user selects an unselected sentence that is permissible to the same extent as with the user selected sentence, and a method in which the user selects an unselected sentence that is obviously impermissible. Performing the above-described processing makes it possible to evaluate unselected sentences, and reflecting the result of the evaluation into the system leads to learning in the system.

In addition, although, in the above description, user presentation sentences and a translated sentence resulting from the translation are output in the form of text with respect to an input sentence, as in FIG. 13, the user presentation sentences and the translated sentence may be presented in the form of text and sound or in the form of only sound. In such a case, the user may select one of the user presentation sentences via a microphone.

The machine translation method according to the present disclosure is useful for a machine translation system in which processing for translation between a first language and a second language is performed through connection to an information output device that outputs language information.

What is claimed is:

1. A machine translation method comprising:
   receiving a translation-source sentence in a first language via a microphone that receives a voice input performed by a user, or receiving the translation-source sentence via a text input device that receives a text input performed by the user; generating a plurality of different first forward-translated sentences resulting from translation of the received translation-source sentence into the second language;
   determining into which of an interrogative form, an affirmative form, a negative form, and an imperative form each of the plurality of different first forward-translated sentences is classified;
   determining a plurality of different second forward-translated sentences from the plurality of different first forward-translated sentences, based on the classified form;
   generating a plurality of backward-translated sentences resulting from backward translation of the plurality of different second forward-translated sentences into the first language; and
   outputting, upon receiving an operation of the user for selecting one of the plurality of backward-translated sentences during output of the plurality of backward-translated sentences on an information output device, a forward-translated sentence corresponding to the selected backward-translated sentence to the information output device.

2. The machine translation method according to claim 1, wherein the method further comprising:
   changing an output form of the forward-translated sentence corresponding to the selected backward-translated sentence in accordance with which of a voice information via the microphone and a text information via the text input device is received as the translation-source sentence.

3. The machine translation method according to claim 2, wherein the information output device has a speaker, a display, and a processor; and
   wherein the machine translation method further comprises:
   outputting, when the translation-source sentence is received via the microphone, the forward-translated sentence corresponding to the selected backward-translated sentence via the speaker; and
   outputting, when the translation-source sentence is received via the input device, the forward-translated sentence corresponding to the selected backward-translated sentence via the display.

4. The machine translation method according to claim 1, wherein the information output device has a processor and a display; and
   wherein the machine translation method further comprises:
   displaying the plurality of backward-translated sentences in a first area on the display; and
   displaying the translation-source sentence in a second area on the display, the second area being different from the first area.

5. The machine translation method according to claim 4, further comprising:
   displaying, in a third area on the display, the forward-translated sentence corresponding to the selected backward-translated sentence.

6. The machine translation method according to claim 5, further comprising:
   displaying the forward-translated sentence corresponding to the selected backward-translated sentence in a direction different from a direction of the plurality of backward-translated sentences displayed in the first area.

7. The machine translation method according to claim 1, wherein the plurality of different second forward-translated sentences include at least two first forward-translated sentences classified into different forms.

8. The machine translation method according to claim 1, further comprising:
   determining a subject or predicate in each forward-translated sentence included in the plurality of different first forward-translated sentences; and
   determining the plurality of different second forward-translated sentences from the plurality of different first forward-translated sentences, based on the determined subject or predicate.

9. The machine translation method according to claim 1, further comprising:
   generating a backward-translated sentence group that is a collection of at least one backward-translated sentence generated for each of the plurality of different second forward-translated sentences;
   calculating evaluation values obtained by evaluating similarities between the translation-source sentence and the at least one backward-translated sentence included in the backward-translated sentence group; and
   selecting the plurality of backward-translated sentences from the backward-translated sentence group, based on the evaluation values.

10. The machine translation method according to claim 1, further comprising:
    generating a backward-translated sentence group that is a collection of at least one backward-translated sentence generated for each of the plurality of different second forward-translated sentences;

determining into which of an interrogative form, an affirmative form, a negative form, and an imperative form each of the at least one backward-translated sentence included in the backward-translated sentence group is classified; and selecting the plurality of backward-translated sentences from the backward-translated sentence group, based on the classified forms.

11. The machine translation method according to claim 10, wherein the plurality of backward-translated sentences include at least two backward-translated sentences classified into the respective different forms.

12. The machine translation method according to claim 1, further comprising:

generating a backward-translated sentence group that is a collection of at least one backward-translated sentence generated for each of the plurality of different second forward-translated sentences;

determining a subject or predicate of each of the at least one backward-translated sentence included in the backward-translated sentence group; and selecting the plurality of backward-translated sentences from the backward-translated sentence group, based on the determined subject or predicate.

13. The machine translation method according to claim 12, wherein the plurality of backward-translated sentences include at least two backward-translated sentences determined to include different predicates or subjects.

14. The machine translation method according to claim 12, wherein the plurality of backward-translated sentences are backward-translated sentences determined to include a same subject or predicate.

15. The machine translation method according to claim 12, wherein a probability model to be referred to is managed, machine learning is applied, and the machine learning is performed based on information indicating which of the plurality of backward-translated sentences is the selected backward-selected sentence, to update a parameter of the probability model.

16. The machine translation method according to claim 15, wherein the probability model includes weight values given to respective words or phrases used in the translation; and wherein the method causes a processor to:

compare a word or a phrase included in a selected forward-translated sentence with a word or a phrase included in an unselected forward-translated sentence, the selected forward-translated sentence corresponding to the selected backward-translated sentence, and the unselected forward-translated sentence corresponding to a backward-translated sentence other than the selected backward-translated sentence;

update the weight values by applying a first method of updating the weight value for the word or the phrase included only in the selected forward-translated sentence, a second method of updating the weight value for the word or the phrase included only in the unselected forward-translated sentence, and a third method of updating the weight value for the word or the phrase included in both the selected forward-translated sentence and the unselected forward-translated sentence, the first, second and third updating methods being different from each other; and perform the machine learning by using, as teacher data, the updated weight values and the words or the phrases corresponding to the updated weight values.

17. The machine translation method according to claim 15, wherein the probability model includes weight values given to respective words or phrases used in the translation; and wherein the method causes a processor to:

compare a word or a phrase included in the selected backward-translated sentence with a word or a phrase included in an unselected backward-translated sentence that is a backward-translated sentence other than the selected backward-translated sentence;

update the weight values by applying a first method of updating the weight value for the word or the phrase included only in the selected backward-translated sentence, a second method of updating the weight value for the word or the phrase included only in the unselected backward-translated sentence, and a third method of updating the weight value for the word or the phrase included in both the selected backward-translated sentence and the unselected backward-translated sentence, the first, second and third updating methods being different from each other; and perform the machine learning by using, as teacher data, the updated weight values and the words or the phrases corresponding to the updated weight values.

18. An apparatus comprising:

a processor; and a memory that stores a computer program, the computer program causing the processor to execute operations including:

receiving a translation-source sentence in a first language via a microphone that receives a voice input performed by a user, or receiving the translation-source sentence via a text input device that receives a text input performed by the user; generating a plurality of different first forward-translated sentences resulting from translation of the received translation-source sentence into the second language;

determining into which of an interrogative form, an affirmative form, a negative form, and an imperative form each of the plurality of different first forward-translated sentences is classified;

determining a plurality of different second forward-translated sentences from the plurality of different first forward-translated sentences, based on the classified form;

generating a plurality of backward-translated sentences resulting from backward translation of the plurality of different second forward-translated sentences into the first language; and outputting, upon receiving an operation of the user for selecting one of the plurality of backward-translated sentences during output of the plurality of backward-translated sentences on an information output device, a forward-translated sentence corresponding to the selected backward-translated sentence to the information output device.

19. A non-transitory recording medium storing a computer program, the computer program causing a processor to execute operations comprising:

receiving a translation-source sentence in a first language via a microphone that receives a voice input performed by a user, or receiving the translation-source sentence via a text input device that receives a text input performed by the user;

generating a plurality of different first forward-translated sentences resulting from translation of the received translation-source sentence into the second language;

determining into which of an interrogative form, an affirmative form, a negative form, and an imperative form each of the plurality of different first forward-translated sentences is classified;

determining a plurality of different second forward-translated sentences from the plurality of different first forward-translated sentences, based on the classified form;

generating a plurality of backward-translated sentences resulting from backward translation of the plurality of different second forward-translated sentences into the first language; and outputting, upon receiving an operation of the user for selecting one of the plurality of backward-translated sentences during output of the plurality of backward-translated sentences on an information output device, a forward-translated sentence corresponding to the selected backward-translated sentence to the information output device.

* * * * *